(12) United States Patent
Wallquist et al.

(10) Patent No.: US 7,417,154 B2
(45) Date of Patent: Aug. 26, 2008

(54) HEAT-STABLE DIKETOPYRROLOPYRROLE PIGMENT MIXTURES

(75) Inventors: Olof Wallquist, Therwil (CH); Roman Lenz, Liestal (CH); Leonhard Feiler, Binzen (DE); Mathias Düggeli, Basel (CH); Taher Yousaf, Tyne and Wear (GB); Gerardus De Keyzer, Riehen (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 37 days.

(21) Appl. No.: 10/576,703

(22) PCT Filed: Oct. 4, 2004

(86) PCT No.: PCT/EP2004/052426

§ 371 (c)(1),
(2), (4) Date: Apr. 19, 2006

(87) PCT Pub. No.: WO2005/040284

PCT Pub. Date: May 6, 2005

(65) Prior Publication Data

US 2007/0028807 A1   Feb. 8, 2007

(30) Foreign Application Priority Data

Oct. 23, 2003 (CH) .................... 1817/03

(51) Int. Cl.
*C07D 487/04* (2006.01)
*C09B 67/22* (2006.01)

(52) U.S. Cl. .................... 548/453; 524/92
(58) Field of Classification Search .................... None
See application file for complete search history.

(56) References Cited

U.S. PATENT DOCUMENTS

| | | | | |
|---|---|---|---|---|
| 4,579,949 | A | 4/1986 | Rochat et al. | 546/167 |
| 4,720,305 | A | 1/1988 | Iqbal et al. | 106/288 |
| 4,783,540 | A | 11/1988 | Babler | 548/453 |
| 5,200,528 | A | 4/1993 | Wooden et al. | 548/453 |
| 5,424,452 | A | 6/1995 | Wooden et al. | 548/453 |
| 5,476,949 | A | 12/1995 | Wallquist et al. | 548/453 |
| 5,738,719 | A | 4/1998 | Wallquist et al. | 106/498 |
| 5,786,487 | A | 7/1998 | Hendi | 548/453 |
| 6,066,202 | A | 5/2000 | Wallquist et al. | 106/494 |
| 6,576,768 | B1 | 6/2003 | Hao et al. | 548/453 |
| 2001/0015154 | A1 | 8/2001 | Lenz et al. | 106/498 |
| 2004/0171847 | A1 | 9/2004 | Morton et al. | 548/453 |
| 2005/0261402 | A1 | 11/2005 | Lenz et al. | 524/104 |
| 2006/0052490 | A1 | 3/2006 | Weber et al. | 524/87 |

FOREIGN PATENT DOCUMENTS

| | | |
|---|---|---|
| DE | 4 037 556 | 5/1991 |
| EP | 0 181 290 | 5/1986 |
| EP | 0 256 983 | 2/1988 |
| EP | 0 511 165 | 10/1992 |
| EP | 0 640 603 | 3/1995 |
| EP | 0 748 851 | 12/1996 |
| EP | 0 877 058 | 11/1998 |
| EP | 1 120 444 | 8/2001 |
| GB | 2 238 550 | 6/1991 |
| WO | WO 9856859 A1 * | 12/1998 |
| WO | 99/54332 | 10/1999 |
| WO | 00/33795 | 6/2000 |
| WO | 03/022847 | 3/2003 |
| WO | 2004/007604 | 1/2004 |
| WO | 2004/018566 | 3/2004 |
| WO | WO 2004076457 A1 * | 9/2004 |

OTHER PUBLICATIONS

English language abstract of WO 00/33795 printed from the esp@cenet web site on Jul. 12, 2006.

* cited by examiner

*Primary Examiner*—Rebecca L Anderson
*Assistant Examiner*—Michael P Barker
(74) *Attorney, Agent, or Firm*—Joseph C. Suhadolnik

(57) ABSTRACT

The present invention relates to a process for the preparation of a mixture comprising at least two structurally different diketopyrrolopyrrole pigments of formula (1) wherein $A_1$ and $A_2$ are each independently of the other an aromatic or heteroaromatic radical, by reacting a succinic acid ester with at least one unsubstituted or substituted aromatic or heteroaromatic nitrile, which process comprises carrying out the reaction in the presence of at least one compound of formula (2) wherein A is an aromatic or heteroaromatic radical, $R_3$ is hydrogen, halogen, methyl, methoxy, $-CF_3$ or $-CN$, $R_4$ is a linear or, from $C_3$ upwards, optionally branched $C_1$-$C_{30}$alkyl, $C_6$-$C_{10}$aryl or $C_6$-$C_{24}$aralkyl radical, X is $-S-$, $-O-$, $-CR_5R_5'-$, $-COO-$, $-CONR_5-$, $-SO-$, $SO_2-$, $-SO_2NR_5-$ or $-NR_5-$ and $R_5$ and $R_5'$ are each independently of the other hydrogen or a linear or, from $C_3$ upwards, optionally branched $C_1$-$C_{30}$alkyl, $C_6$-$C_{10}$aryl or $C_6$-$C_{24}$aralkyl radical, to the use of such a mixture in the coloring of organic material and in cosmetics, and also to novel diketopyrrolopyrrole pigment mixtures

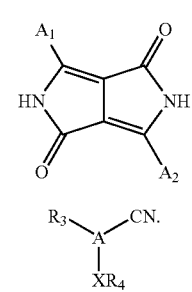

9 Claims, No Drawings

HEAT-STABLE DIKETOPYRROLOPYRROLE PIGMENT MIXTURES

The present invention relates to a process for the preparation of heat-stable, tinctorially strong diketopyrrolopyrrole pigment mixtures and to their use in the colouring of organic material and in cosmetics, and also to novel diketopyrrolopyrrole pigment mixtures.

The known pigments, especially those of relatively small particle size, which are distinguished by a relatively high tinctorial strength, are often not able fully to meet today's requirements especially in terms of fastness properties such as, for example, fastness to migration, to light, to weathering and to heat, for example in polyolefins. The same is also true of pigments for colour filter applications, where a high degree of transparency, or contrast, and good fastness to heat are required.

The problem of the present invention was to make available heat-fast and tinctorially strong transparent pigments, especially in the form of pigment mixtures, which are distinguished by very good dispersibility and good warping behaviour, for example in partially crystalline plastics, and which can be produced by a simple and economically advantageous preparation process.

It has now been found, surprisingly, that pigment mixtures having the above advantageous properties can be obtained using the inventive process described hereinbelow.

The present Application accordingly relates to a process for the preparation of a mixture comprising at least two structurally different diketopyrrolopyrrole pigments of formula

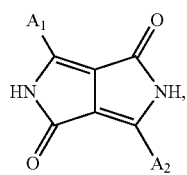

(1)

wherein
$A_1$ and $A_2$ are each independently of the other an aromatic or heteroaromatic radical, by reacting a succinic acid ester with at least one unsubstituted or substituted aromatic or heteroaromatic nitrile, which process comprises carrying out the reaction in the presence of at least one compound of formula

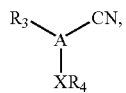

(2)

wherein
A is an aromatic or heteroaromatic radical,
$R_3$ is hydrogen, halogen, methyl, methoxy, —$CF_3$ or —CN,
$R_4$ is a linear or, from $C_3$ upwards, optionally branched $C_1$-$C_{30}$alkyl, $C_6$-$C_{10}$aryl or $C_6$-$C_{24}$aralkyl radical,
X is —S—, —O—, —$CR_5R_5'$—, —COO—, —$CONR_5$—, —SO—, $SO_2$—, —$SO_2NR_5$— or —$NR_5$—, and
$R_5$ and $R_5'$ are each independently of the other hydrogen or a linear or, from $C_3$ upwards, optionally branched $C_1$-$C_{30}$alkyl, $C_8$-$C_{10}$aryl or $C_6$-$C_{24}$aralkyl radical.

The amount of the compound of formula (2) is advantageously from 1 to 10 mol %, especially from 2 to 6 mol %, based on the total amount of nitrile.

A is preferably an aromatic radical such as, for example, a naphthyl radical, diphenyl radical or, especially, a phenyl radical.

$A_1$ is preferably an aromatic radical such as, for example, a naphthyl radical, diphenyl radical or, especially, a phenyl radical.

$A_2$ is preferably an aromatic radical such as, for example, a naphthyl radical, diphenyl radical or, especially, a phenyl radical.

The naphthyl radicals in the meanings of A, $A_1$ and $A_2$ may be unsubstituted or, each independently of the others, mono- or poly-substituted by chlorine, bromine, methyl, tert-butyl, methoxy, phenyl, —$CF_3$, —S-phenyl or by —$SO_2$-phenyl.

The diphenyl radicals in the meanings of A, $A_1$ and $A_2$ may be unsubstituted or, each independently of the others, mono- or poly-substituted by chlorine, bromine, methyl, tert-butyl, methoxy, phenyl, —$CF_3$, —S-phenyl or by —$SO_2$-phenyl.

The phenyl radicals in the meanings of A, $A_1$ and $A_2$ may be unsubstituted or, each independently of the others, mono- or poly-substituted by halogen, e.g. chlorine or bromine, $C_1$-$C_4$alkyl, e.g. methyl, ethyl, n-propyl, isopropyl, n-butyl, sec-butyl, isobutyl or tert-butyl, or $C_1$-$C_4$alkoxy, e.g. methoxy or ethoxy, —$CF_3$, —CN, phenyl, —O-aryl, e.g. phenoxy, —SO-aryl, e.g. —SO-phenyl, —$SO_2$-aryl, e.g. —$SO_2$-phenyl, or by aryl, e.g. —S-phenyl.

The phenyl radicals in the meanings of $A_1$ and $A_2$ are preferably unsubstituted or, each independently of the others, mono- or poly-substituted by chlorine, bromine, methyl, tert-butyl, methoxy, phenyl, —$CF_3$, —S-phenyl or by —$SO_2$-phenyl.

X is preferably —SO—, —O—, —$SO_2$— or —S—.

X is especially —$SO_2$— and more especially —S—.

$R_3$ is preferably hydrogen.

$R_4$ as linear or, from $C_3$ upwards, optionally branched $C_1$-$C_{30}$alkyl may also, if desired, contain ether, amide or ester groups.

The alkyl chain may in that case be interrupted one or more times by —O—, —NH—, —S—, —$CO_2$—NH—, —$CO_2$—O—, —$SO_2$—O— or by —$SO_2$—NH—.

$R_4$ is preferably a $C_8$-$C_{28}$alkyl radical, especially a linear $C_{12}$-$C_{24}$alkyl radical, more especially a linear $C_{16}$-$C_{20}$alkyl radical, very especially a linear $C_{18}$alkyl radical.

A preferred embodiment of the process according to the invention results in mixtures comprising at least one diketopyrrolopyrrole pigment of formula

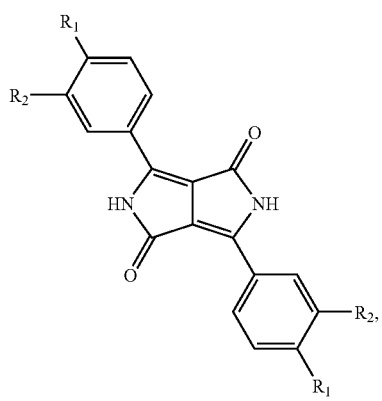

(3)

wherein
the two substituents $R_1$ are each independently of the other hydrogen, chlorine, bromine, $C_1$-$C_4$alkyl, methoxy, —$CF_3$, —CN, phenyl, —S-aryl or —$SO_2$-aryl and
the two substituents $R_2$ are each independently of the other hydrogen, chlorine, bromine, methyl, tert-butyl, methoxy, —$CF_3$ or —CN,
and at least one diketopyrrolopyrrole pigment selected from the group consisting of structurally different diketopyrrolopyrrole pigments of formulae

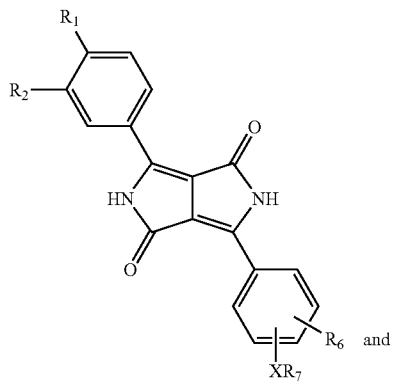

(4)

(5)

wherein
$R_1$ and $R_2$ are as defined for formula (3),
$R_6$ is hydrogen, halogen, $C_1$-$C_4$alkyl, methoxy, —$CF_3$ or —CN,
$R_7$ is a linear or, from $C_3$ upwards, optionally branched $C_1$-$C_{30}$alkyl, $C_8$-$C_{10}$aryl or $C_6$-$C_{24}$aralkyl radical,
X is —S—, —O—, —$CR_5R_5'$—, —COO—, —$CONR_5$—, —SO—, $SO_2$, —$SO_2NR_5$— or —$NR_5$—, and
$R_5$ and $R_5'$ are each independently of the other hydrogen or a linear or, from $C_3$ upwards, optionally branched $C_1$-$C_{30}$alkyl, $C_6$-$C_{10}$aryl or $C_6$-$C_{24}$aralkyl radical.
$R_6$ is preferably hydrogen.
The radical $XR_7$ is preferably bonded in the para-position.
$R_7$ as linear or, from $C_3$ upwards, optionally branched $C_1$-$C_{30}$alkyl may also, if desired, contain ether, amide or ester groups.
The alkyl chain may in that case be interrupted one or more times by —O—, —NH—, —S—, —$CO_2$—NH—, —$CO_2$—O—, —$SO_2$—O— or by —$SO_2$—NH—.
$R_7$ is preferably a $C_8$-$C_{28}$alkyl radical, especially a linear $C_{12}$-$C_{24}$alkyl radical, more especially a linear $C_{16}$-$C_{20}$alkyl radical, very especially a linear $C_{18}$alkyl radical.

An especially preferred embodiment of the process according to the invention results in mixtures comprising at least one diketopyrrolopyrrole pigment of formula (3a)

wherein
the two substituents $R_1'$ are each independently of the other hydrogen, chlorine, bromine, methyl, tert-butyl, methoxy, —$CF_3$, phenyl, —S-phenyl or —CN, and
the two substituents $R_2$ are hydrogen, chlorine, bromine, methyl, tert-butyl, methoxy, —$CF_3$ or —CN,
and at least one diketopyrrolopyrrole pigment selected from the group consisting of structurally different diketopyrrolopyrrole pigments of formulae (4a)

(5a)

wherein
R$_1$' and R$_2$ are as defined for formula (3a),
R$_6$' is hydrogen, and
R$_7$' is a linear C$_{18}$-C$_{20}$alkyl radical.

Diketopyrrolopyrrole pigment mixtures comprising the diketopyrrolopyrrole pigments of formulae (3a) and (4a) are especially important in the context of the present invention.

Among the diketopyrrolopyrrole pigment mixtures prepared in accordance with the invention special preference is given to those mixtures which comprise the diketopyrrolopyrrole pigments of formulae (mixture A)

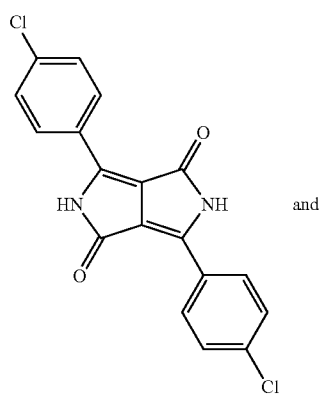

and

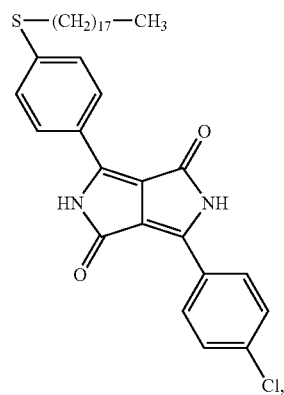

(mixture B)

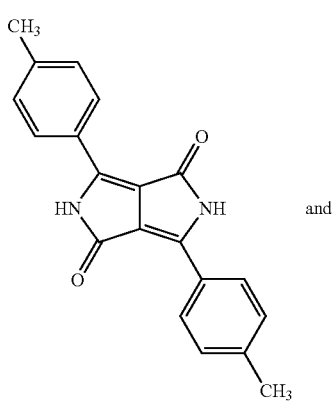

-continued

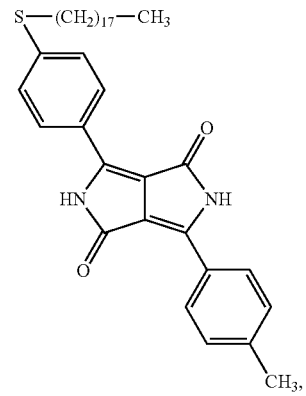

(mixture C)

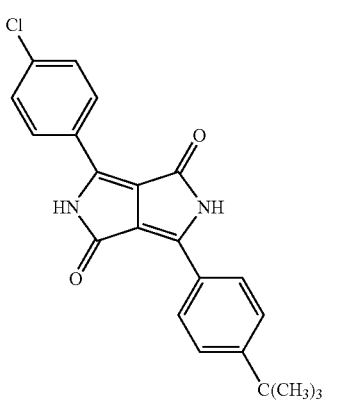

and

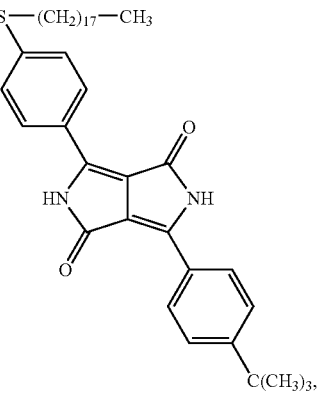

-continued
(mixture D)
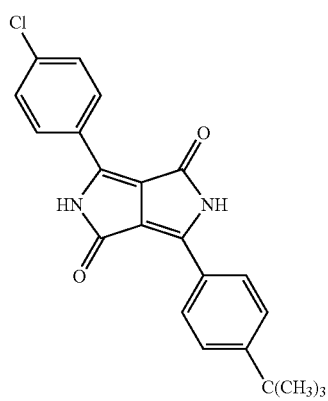
and
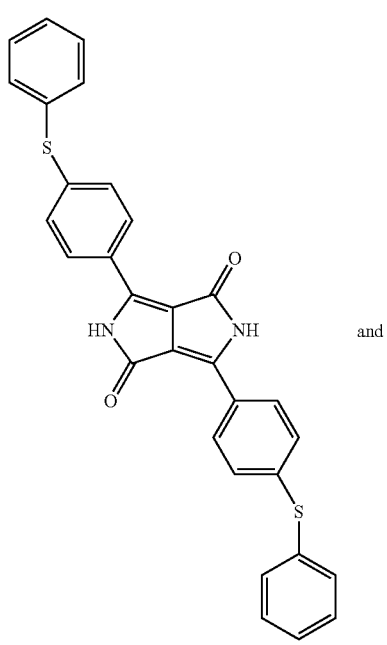,
(mixture E)
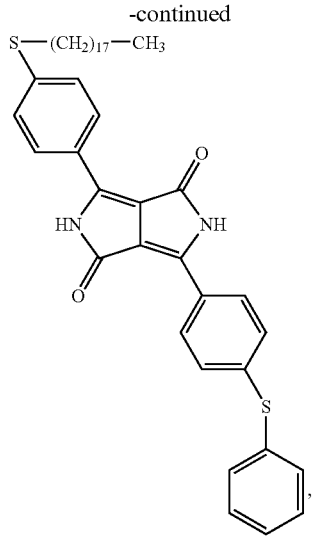,
(mixture F)
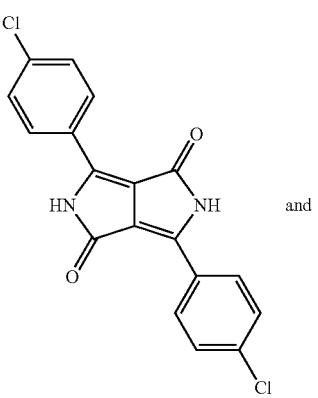
and -continued

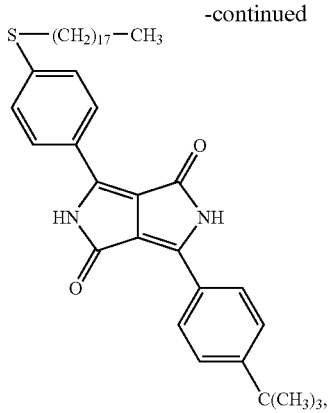

(mixture G)

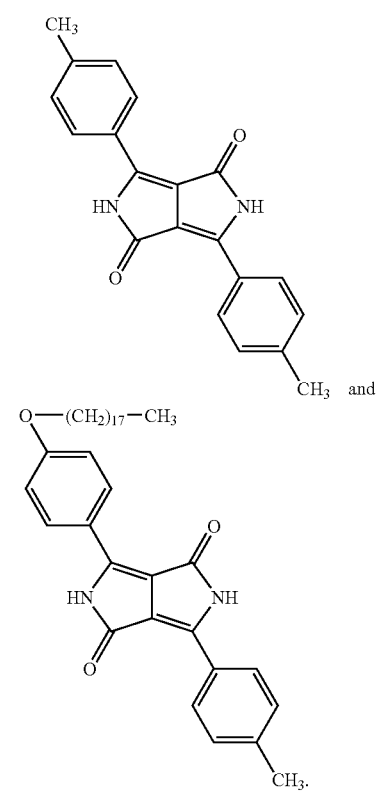

The mixtures (A), (B), (C), (D), (E), (F) and (G) are novel and the present Application relates also thereto.

The reaction of a succinic acid ester with at least one unsubstituted or substituted aromatic or heteroaromatic nitrile and in the presence of at least one compound of formula (2) is carried out in accordance with generally known processes for the preparation of diketopyrrolopyrrole compounds in an organic solvent in the presence of a base at elevated temperature, as described, for example, in U.S. Pat. No. 4,720,305 or in U.S. Pat. No. 4,579,949.

The preparation of the diketopyrrolopyrrole pigment mixtures (A), (B), (C), (D), (E) and (F) according to the invention is generally carried out analogously to the process described in U.S. Pat. No. 4,720,305 by reacting a mixture consisting of a compound of formula

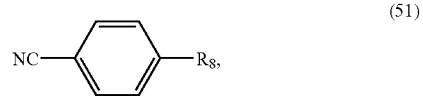

wherein $R_8$ is chlorine, methyl, tert-butyl, phenyl or S-phenyl, and a compound of formula

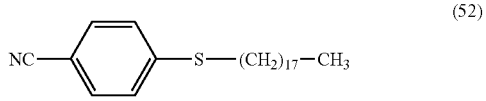

with a succinic acid diester,
or by reacting a mixture consisting of two structurally different compounds of formula (51) and a compound of formula (52) with a succinic acid diester.

The preparation of the diketopyrrolopyrrole pigment mixture (G) according to the invention is carried out analogously, using, instead of the compound of formula (52), the compound of formula

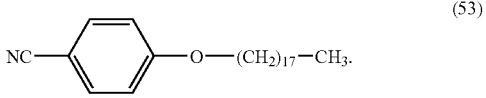

The preparation of the diketopyrrolopyrrole pigment mixtures (A), (B), (C), (D), (E) and (F) according to the invention can, moreover, also be carried out analogously to the process described in WO99/54332.

The overall concentration of nitriles in the organic solvent is usually selected in the range from 5 mol/l to 0.5 mol/l.

The molar ratio of base to succinic acid diester is generally in the range from 0.1 to 10 mol of base to 1 mol of succinic acid diester.

The pressure selected is preferably atmospheric pressure.

The reaction temperature is usually in the range from 60 to 140° C., preferably in the range from 80 to 120° C.

The reaction duration is usually selected in dependence on the temperature selected. It is generally in the range from 30 minutes to 20 hours.

Using customary methods, for example as described in U.S. Pat. No. 4,783,540 and U.S. Pat. No. 4,579,949, the reaction product can be worked up by protonation and subsequently isolated.

Organic solvents may be, for example, polar, non-polar, protic or aprotic organic solvents. In detail, examples of solvents that may be used include ethers, e.g. tetrahydrofuran, dioxane or glycol ethers, e.g. ethylene glycol methyl ether, ethylene glycol ethyl ether, diethylene glycol monomethyl ether or diethylene glycol monoethyl ether, or aromatic hydrocarbons, e.g. benzene or alkyl-, alkoxy- or halo-substituted benzene, e.g. toluene, xylene, anisole or chlorobenzene, dichloro- or trichloro-benzene, N,N'-dimethylacetamide, N-methylpyrrolidone, or aromatic N-heterocyclic compounds, e.g. pyridine, picoline or quinoline, or alcohols such as secondary and tertiary alcohols, e.g. tert-butanol, sec-amyl alcohol or tert-amyl alcohol, and also ethylene glycol or propylene glycol. The mentioned solvents may also be used in the form of mixtures.

As base there may be used, for example, alkali metals, e.g. lithium, sodium or potassium, or hydroxides thereof, e.g. lithium, sodium or potassium hydroxide, or their alkali metal amides, e.g. lithium, sodium or potassium amide, or their alkali metal hydrides, e.g. lithium, sodium or potassium hydride, or their alkali metal alcoholates, especially alcohols of $C_4$-$C_{10}$alkanes, e.g. calcium, magnesium, lithium, sodium or potassium tert-butylate, potassium tert-amylate, potassium 2-methyl-2-pentylate, potassium 3-methyl-3-pentylate or potassium 3-ethyl-3-pentylate.

Succinic acid diesters are symmetrical or asymmetrical diesters, preferably symmetrical diesters. Preference is given to the use of succinic acid dialkyl esters such as succinic acid di($C_1$-$C_{12}$alkyl) esters, preferably succinic acid di($C_1$-$C_8$alkyl) esters and especially succinic acid di($C_1$-$C_5$alkyl) esters, and also succinic acid diaryl and succinic acid monoaryl monoalkyl esters, wherein aryl may be unsubstituted or substituted, for example by one or two halogen radicals, $C_1$-$C_6$alkyl or by $C_1$-$C$alkoxy. Aryl is preferably phenyl.

Special preference is given to succinic acid diesters such as succinic acid dimethyl ester, diethyl ester, dipropyl ester, dibutyl ester, dipentyl ester, diheptyl ester, dioctyl ester, diisopropyl ester, diheptyl ester, di-sec-butyl ester, di-tert-butyl ester, di-tert-amyl ester, di[1,1-dimethylbutyl] ester, di[1,1,3, 3-tetramethylbutyl] ester, di[1,1-dimethylpentyl] ester, di[1-methyl-1-butyl] ester, di[1,1-dimethylpentyl] ester, di[1-methyl-1-ethyl-butyl] ester, di[1,1-diethylpropyl] ester, diphenyl ester, di[4-methylphenyl] ester, di[2-methylphenyl] ester, di[4-chlorophenyl] ester, di[2,4-dichlorophenyl] ester or monoethyl monophenyl ester.

The above-mentioned succinic acid diesters are known and, in some cases, commercially available compounds.

If desired, rheology-improving compounds may be added to the diketopyrrolopyrrole pigment mixtures prepared in accordance with the invention and to the diketopyrrolopyrrole pigment mixtures according to the invention.

A further preferred embodiment of the present invention accordingly relates to compositions comprising diketopyrrolopyrrole pigment mixtures prepared in accordance with the invention and/or diketopyrrolopyrrole pigment mixtures according to the invention and rheology-improving compounds.

The amount of rheology-improving compounds used relative to the amount of the pigment mixture is generally in the range from 0.1 to 20% by weight, preferably from 0.5 to 10% by weight.

Rheology-improving compounds are known and are, for example, diketopyrrolopyrrole derivatives or compositions comprising diketopyrrolopyrrole derivatives, especially diketopyrrolopyrrolesulfonic acid salts, as described, for example, in GB-A-2 238 550, U.S. Pat. No. 4,791,204, U.S. Pat. No. 4,914,211, GB-A-430 875, U.S. Pat. No. 5,271,759, U.S. Pat. No. 5,785,750 or U.S. Pat. No. 5,786,487, or amino-substituted diketopyrrolopyrroles, as known from U.S. Pat. No. 5,334,727, U.S. Pat. No. 5,200,528, U.S. Pat. No. 5,685,901, U.S. Pat. No. 5,342,955, U.S. Pat. No. 5,424,452 or U.S. Pat. No. 6,066,202, or silane-substituted diketopyrrolopyrroles, as known from U.S. Pat. No. 5,482,547. Rheology-improving compounds are also, for example, polymers, as known from U.S. Pat. No. 5,145,524, U.S. Pat. No. 5,685,901 or U.S. Pat. No. 5,679,148, or chelate complexes, as described in U.S. Pat. No. 5,685,901, or inorganic compounds used as coatings, as known, for example, from U.S. Pat. No. 4,880,472, U.S. Pat. No. 4,808,230, U.S. Pat. No. 4,889,562, U.S. Pat. No. 5,522,925 or U.S. Pat. No. 5,641,350, or quinacridone derivatives, as known, for example, from U.S. Pat. No. 5,827,364, or perylene additives, as described in EP-A-1 029 899.

The rheology-improving compound can usually be added during or after preparation of the diketopyrrolopyrrole pigment mixture.

The diketopyrrolopyrrole pigment mixture is generally brought into contact with the rheology-improving compounds by customary methods of mixing.

A preferred embodiment of the present invention relates, moreover, to compositions comprising a diketopyrrolopyrrole pigment mixture obtainable by the method according to the invention together with rheology-improving compounds.

If desired, texture improvers can be added to the diketopyrrolopyrrole pigment mixtures according to the invention.

Suitable texture improvers include, for example, fatty acids having at least 12 carbon atoms, such as, especially, stearic or behenic acid, stearic or behenic acid amide, salts of stearic or behenic acid, such as magnesium, zinc or aluminium stearate or behenate, and also quarternary ammonium compounds, such as, especially, tri($C_1$-$C_4$)alkylbenzylammonium salts, e.g. trimethyl-, triethyl-, tri-n-propyl-, tri-isopropyl-, tri-n-butyl-, tri-sec-butyl- and tri-tert-butyl-benzylammonium salts, and also plasticisers, such as epoxidised soybean oil, waxes, such as polyethylene wax, resin acids, such as abietic acid, colophony soap, hydrogenated or dimerised colophony, ($C_{12}$-$C_{18}$)paraffindisulfonic acid, alkylphenols and alcohols, such as stearyl alcohol. Also suitable are lauryl amine and stearyl amine, as well as aliphatic 1,2-diols, such as 1,2-dodecanediol.

Preferred texture improvers are lauryl amine and stearyl amine, aliphatic 1,2-diols, stearic acid and its amides, salts and esters, epoxidised soybean oil, waxes and resin acids.

Such additives may be added in amounts of from 0.05 to 20% by weight, preferably from 1 to 10% by weight, based on the composition according to the invention, before, during or after its preparation.

The diketopyrrolopyrrole pigment mixtures prepared in accordance with the invention and the diketopyrrolopyrrole pigment mixtures according to the invention can be used in the colouring of organic material, especially low molecular weight or high molecular weight organic material.

A further embodiment of the invention accordingly relates to a method of colouring organic material by mixing organic material and a tinctorially effective amount of a diketopyrrolopyrrole pigment mixture prepared in accordance with the invention or a diketopyrrolopyrrole pigment mixture according to the invention with one another.

If desired, the products obtained in the preparation of the diketopyrrolopyrrole pigment mixtures can be converted into a disperse form. This can be achieved in a manner known per se. Depending upon the compound and the intended use, it has proved advantageous to use the colorants as toners or in the form of preparations.

Low molecular weight organic material may be, for example, mineral oil, lubricating grease or wax.

High molecular weight material having a molecular weight ($M_w$) of from $10^4$ to $10^8$ g/mol may be, for example, synthetic and/or natural substances, for example natural resins or drying oils, rubber or casein, or modified natural substances, such as chlorinated rubber, oil-modified alkyd resins, viscose, or cellulose ethers or esters, such as ethylcellulose, cellulose acetate, propionate or butyrate, cellulose acetobutyrate and nitrocellulose, but especially completely synthetic organic polymers (thermosetting plastics and thermoplastics), as can be obtained by polymerisation, for example by polycondensation or polyaddition. The class of the polymers includes, for example, polyolefins, such as polyethylene, polypropylene, polyisobutylene, also substituted polyolefins, such as polymerisation products of monomers, such as vinyl chloride, vinyl acetate, styrene, acrylonitrile, acrylic acid esters, methacrylic acid esters, fluorinated polymerisation products, such as polyfluoroethylene or polytrifluorochloroethylene or a tetrafluoroethylene/hexafluoropropylene mixed polymerisation product, and also copolymerisation products of the mentioned monomers. From the range of polyaddition and polycondensation resins there may be used, for example, condensation products of formaldehyde with phenols, so-called phenoplasts, and condensation products of formaldehyde and urea or thiourea; also melamine, so-called aminoplasts; also the polyesters used as surface-coating resins, either saturated, such as alkyd resins, or unsaturated, such as maleic resins; also linear polyesters, polycarbonates, polyphenylene oxides or silicones, and silicone resins. The high molecular weight organic material may also be a partially crystalline or amorphous plastics, such as LLDPE (linear low-density polyethylene).

"Partially crystalline plastics" are to be understood as meaning plastics that on solidification form small crystalline nuclei or aggregates (for example spherulites or quadrites), including such materials that do this only in the presence of nucleating agents (for example organic pigments).

Plastics may be thermoplastic high molecular weight organic materials having a molecular weight ($M_w$) of from $10^4$ to $10^8$ g/mol, preferably from $10^5$ to $10^7$ g/mol. Where the plastics are partially crystalline, they usually have a degree of crystallinity ($X_c$) of from 10 to 99.9%, especially from 40 to 99%, more especially from 80 to 99%. Preferred partially crystalline plastics are homopolymers, block or random copolymers and terpolymers of ethylene, propylene, butylene, styrene and/or divinylbenzene, especially α-olefins, such as HDPE (high-density polyethylene), LDPE (low-density polyethylene), polypropylene and polystyrene, as well as polyesters, such as polyethylene terephthalate (PET) and thermoplastic ionomers. Especially preferred partially crystalline plastics are polyolefins, especially polyethylene of high-density and polypropylene. The partially crystalline plastics may also optionally comprise customary amounts of additives, for example stabilisers, fluorescent whitening agents, fillers and/or lubricants.

The mentioned high molecular weight compounds may be present individually or in mixtures as plastic masses, melts or in the form of spinning solutions. They may also be in the form of their monomers or in the polymerised state in dissolved form as film formers or binders for surface-coatings or for printing inks, e.g. boiled linseed oil, nitrocellulose, alkyd resins, melamine resins and urea-formaldehyde resins or acrylic resins.

The present invention relates also to the use of the diketopyrrolopyrrole pigment mixtures prepared in accordance with the invention or of the diketopyrrolopyrrole pigment mixtures according to the invention in the production of inks, for printing inks in printing processes, for flexographic printing, screen printing, the printing of packaging, security colour printing, intaglio printing or offset printing, for preliminary stages of printing and for printing textiles, for office or home use or for graphics applications, for example for paper goods, for ballpoint pens, felt-tip pens, fibre-tip pens, cardboard, wood, (wood)stains, metal, stamp pads or inks for impact-printing processes (using impact printing ink ribbons), in the production of surface-coatings, for industrial or commercial use, for textile decoration and industrial labelling, for coil coatings or powder coatings or for automotive finishes, for high-solids (low-solvent), aqueous or metallic paints or for pigmented formulations for water-based paints, for mineral oils, lubricating greases or waxes, in the production of coloured plastics for coatings, fibres, plates or shaped substrates, in the production of non-impact-printing material for digital printing, for thermal wax transfer printing, ink-jet printing or for thermal transfer printing, and also in the production of polymeric colour particles, toners, dry copy toners, liquid copy toners or electrophotographic toners.

The present invention relates also to inks comprising high molecular weight organic material and a tinctorially effective amount of the diketopyrrolopyrrole pigment mixture prepared in accordance with the invention or of the diketopyrrolopyrrole pigment mixture according to the invention.

Methods of producing inks, especially for ink-jet printing, are generally known and are described, for example, in U.S. Pat. No. 5,106,412.

The inks can be produced, for example, by blending the diketopyrrolopyrrole pigment mixtures prepared in accordance with the invention or the diketopyrrolopyrrole pigment mixtures according to the invention with polymeric dispersants.

Blending of the diketopyrrolopyrrole pigment mixture prepared in accordance with the invention or of the diketopyrrolopyrrole pigment mixture according to the invention with the polymeric dispersant is preferably carried out according to generally known methods of blending, such as stirring or mixing, the use of an intensive mixer (e.g. of the trade mark Ultra-Turrax®) being especially recommended.

When blending the diketopyrrolopyrrole pigment mixtures prepared in accordance with the invention or the diketopyrrolopyrrole pigment mixtures according to the invention with polymeric dispersants it is advantageous to use an organic solvent, especially a water-miscible organic polar, protic or aprotic solvent, e.g. an alcohol or ketone.

The ratio by weight of the diketopyrrolopyrrole pigment mixture prepared in accordance with the invention or of the diketopyrrolopyrrole pigment mixture according to the invention relative to the ink is advantageously selected in the range from 0.0001 to 75% by weight, especially from 0.001 to 50% by weight, based on the total weight of the ink.

The present invention accordingly relates also to a method of producing inks, which comprises blending together high molecular weight organic material and a tinctorially effective amount of the diketopyrrolopyrrole pigment mixtures prepared in accordance with the invention or of the diketopyrrolopyrrole pigment mixtures according to the invention.

The present invention relates also to colorants comprising high molecular weight organic material and a tinctorially effective amount of a diketopyrrolopyrrole pigment mixture prepared in accordance with the invention or of a diketopyrrolopyrrole pigment mixture according to the invention.

The present invention relates also to a method of producing colorants, which comprises blending together a high molecular weight organic material and a tinctorially effective amount of the diketopyrrolopyrrole pigment mixture prepared in accordance with the invention or of the diketopyrrolopyrrole pigment mixture according to the invention.

The present invention relates also to coloured plastics or polymeric colour particles comprising high molecular weight organic material and a tinctorially effective amount of the diketopyrrolopyrrole pigment mixture prepared in accordance with the invention or of the diketopyrrolopyrrole pigment mixture according to the invention.

The present invention relates also to a method of producing coloured plastics or polymeric colour particles, especially of producing mass-coloured plastics, which comprises blending together a high molecular weight organic material and a tinctorially effective amount of the diketopyrrolopyrrole pigment mixture prepared in accordance with the invention or of the diketopyrrolopyrrole pigment mixture according to the invention.

Colouring the high molecular weight organic substances with the diketopyrrolopyrrole pigment mixtures prepared in accordance with the invention or with the diketopyrrolopyrrole pigment mixtures according to the invention is carried out, for example, by mixing such a colorant, optionally in the form of a masterbatch, into the substrates using roll mills or mixing or grinding apparatuses, as a result of which the colorant is dissolved in the high molecular weight material or is finely distributed therein. The high molecular weight organic material comprising the admixed colorant is then processed by methods known per se, such as calendering, compression moulding, extrusion, spread-coating, spinning, casting or by injection moulding, whereby the coloured material acquires its final shape. Admixture of the colorant can also be effected immediately prior to the actual processing step, for example by continuously feeding a pulverulent colorant according to the invention and, at the same time, a granulated high molecular weight organic material, and optionally also additional ingredients such as, for example, additives, directly into the intake zone of an extruder, where mixing takes place immediately before processing. Generally, however, it is preferable to mix the colorant into the high molecular weight organic material beforehand, since more uniform results can be achieved. In order to produce non-rigid mouldings or to reduce their brittleness, it is frequently desirable to incorporate so-called plasticisers into the high molecular weight compounds prior to shaping. There may be used as plasticisers, for example, esters of phosphoric acid, phthalic acid or sebacic add. In the process according to the invention, the plasticisers can be incorporated into the polymers before or after the incorporation of the colorant. It is also possible, in order to achieve different colour shades, to add to the high molecular weight organic materials, in addition to the pigment mixtures or pigment compositions according to the invention, constituents such as white, coloured or black pigments, in any desired amounts.

A further embodiment of the present invention accordingly relates to a method of producing coloured, especially mass-coloured, plastics, especially partially crystalline plastics, by shaping the diketopyrrolopyrrole pigment mixture prepared in accordance with the invention or the diketopyrrolopyrrole pigment mixture according to the invention together with the plastics in an injection-moulding method.

The constituents of the injection-moulding formulation may be premixed before being fed into the injection-moulding machine, or they may alternatively be fed in individually at the same time. It is also possible to premix two or more components, and if desired also additives, and then to feed the mixture into the injection-moulding machine together with other components, which may be used individually or may likewise be premixed.

A particular embodiment of the processes according to the invention relates to their being carried out in masterbatches.

In a masterbatch the concentration of the diketopyrrolopyrrole pigment mixture prepared in accordance with the invention or of the diketopyrrolopyrrole pigment mixture according to the invention is preferably from 5 to 70% by weight, based on the total weight of the diketopyrrolopyrrole pigment mixture prepared in accordance with the invention or diketopyrrolopyrrole pigment mixture according to the invention and the plastics.

For the colouring of surface-coatings and printing inks, the high molecular weight organic materials and the diketopyrrolopyrrole pigment mixture prepared in accordance with the invention or the diketopyrrolopyrrole pigment mixture according to the invention are finely dispersed or dissolved, optionally together with additives, such as fillers, dyes, pigments, siccatives (drying agents) or plasticisers, in the same organic solvent or solvent mixture. It is also possible to use a procedure in which the individual components are dispersed or dissolved separately or in which a plurality thereof are dispersed or dissolved together, and only then all of the components combined. The processing is effected according to customary methods, for example by spraying, film-coating or one of the many printing methods, the surface-coating or the printing ink advantageously being cured thermally or by irradiation, where appropriate after drying beforehand. When the high molecular weight material to be coloured is a surface-coating, it may be a customary surface-coating or a specialist surface-coating, for example an automotive finish.

Preference is given to the colouring of thermoplastic plastics, especially in the form of fibres, as well as printing inks. Preferred high molecular weight organic materials suitable for colouring in accordance with the invention are very generally polymers having a dielectric constant $\geqq 2.5$, especially polyesters, polycarbonate (PC), polystyrene (PS), polymethyl methacrylate (PMMA), polyamide, polyethylene, polypropylene, styrene/acrylonitrile (SAN) and acrylonitrile/butadiene/styrene (ABS). Especially preferred are polyesters, polycarbonate, polystyrene and PMMA. More especially preferred are polyesters, polycarbonate and PMMA, especially aromatic polyesters, which can be obtained by polycondensation of terephthalic acid, for example polyethylene terephthalate (PET) or polybutylene terephthalate (PBTP).

Special preference is given also to the colouring of low molecular weight organic material, such as mineral oils, lubricating greases and waxes, using the diketopyrrolopyrrole pigment mixtures prepared in accordance with the invention or the diketopyrrolopyrrole pigment mixtures according to the invention.

The present invention relates also to non-impact-printing material comprising high molecular weight organic material and a tinctorially effective amount of a diketopyrrolopyrrole pigment mixture prepared in accordance with the invention or of a diketopyrrolopyrrole pigment mixture according to the invention.

The present invention relates also to a method of producing non-impact-printing material, which comprises blending together a high molecular weight organic material and a tinctorially effective amount of the diketopyrrolopyrrole pigment mixture prepared in accordance with the invention or of the diketopyrrolopyrrole pigment mixture according to the invention.

The present invention relates also to toners comprising high molecular weight organic material and a tinctorially effective amount of a diketopyrrolopyrrole pigment mixture prepared in accordance with the invention or of a diketopyrrolopyrrole pigment mixture according to the invention.

The present invention relates also to methods of producing toners, wherein a high molecular weight organic material and a tinctorially effective amount of the diketopyrrolopyrrole pigment mixture prepared in accordance with the invention or of the diketopyrrolopyrrole pigment mixture according to the invention are blended together.

In a particular embodiment of the method according to the invention, toners, paints, inks or coloured plastics are prepared by processing masterbatches of toners, paints, inks or coloured plastics in roll mills or mixing or grinding apparatuses.

The invention relates also to a method of modifying the spectrum of a beam of visible light by selective absorption of part of the radiation by means of a coloured medium, which comprises using, as the coloured medium, a pigmented high molecular weight polymeric material according to the invention coated onto a transparent substrate.

The present invention accordingly relates also to colour filters produced using the high molecular weight polymeric material comprising at least one diketopyrrolopyrrole pigment mixture prepared in accordance with the invention or diketopyrrolopyrrole pigment mixture according to the invention.

The production of colour filters by sequentially applying a red, blue and green pigment to a suitable substrate, e.g. amorphous silicon, is described in GB-A 2 182 165. The colour filters can be coated, for example, using inks, especially printing inks, which comprise a diketopyrrolopyrrole pigment mixture prepared in accordance with the invention or a diketopyrrolopyrrole pigment mixture according to the invention or they can be produced, for example, by mixing a diketopyrrolopyrrole pigment mixture prepared in accordance with the invention or a diketopyrrolopyrrole pigment mixture according to the invention with chemically, thermally or photolytically structurable high molecular weight material. The rest of the production can be carried out, for example, analogously to EP-A 654 711 by means of application to a substrate, e.g. an LCD, followed by photostructuring and developing. A further document in which the production of colour filters is described is U.S. Pat. No. 5,624,467.

The colour filters according to the invention can be used with excellent results, especially in terms of transparency, transmittance and heat stability, in liquid crystal displays, plasma displays or electroluminescent displays, which may be, for example, active (twisted nematic) or passive (super-twisted nematic) ferroelectric displays or light-emitting diodes.

A tinctorially effective amount of the diketopyrrolopyrrole pigment mixture prepared in accordance with the invention or of the diketopyrrolopyrrole pigment mixture according to the invention generally means, in the present invention, from 0.0001 to 99.99% by weight, preferably from 0.001 to 50% by weight, and especially from 0.01 to 50% by weight, based on the total weight of the material to be coloured therewith.

In particular it has been found that the diketopyrrolopyrrole pigment mixtures prepared in accordance with the invention and the diketopyrrolopyrrole pigment mixtures according to the invention, for example in thermoplastic or thermosetting plastic materials, fibres, surface-coatings or printing inks, are distinguished by a pure hue, high tinctorial strength, high saturation and very high transparency, good fastness to migration, to rubbing, to light and to weathering, very good heat stability and also by good gloss.

The diketopyrrolopyrrole pigment mixtures prepared in accordance with the invention or the diketopyrrolopyrrole pigment mixtures according to the invention can also be used in cosmetic preparations or compositions. The amount of diketopyrrolopyrrole pigment mixtures to be used will depend on the nature of the cosmetic preparations or compositions. Usually, from 0.0001 to 50% by weight, preferably from 0.5 to 25% by weight, based on the total weight of the cosmetic preparations or compositions, of the diketopyrrolopyrrole pigment mixtures prepared in accordance with the invention or of the diketopyrrolopyrrole pigment mixtures according to the invention will be used.

It is also usual to use, in addition to the diketopyrrolopyrrole pigment mixtures prepared in accordance with the invention or the diketopyrrolopyrrole pigment mixtures according to the invention, other pigments, goniochromatic pigments and/or dyes which are customarily used in cosmetic preparations or compositions. Such inorganic or organic pigments and/or dyes are usually used in an amount of from 0 to 25% by weight, preferably from 2 to 15% by weight, based on the total weight of the cosmetic preparations or compositions. Examples of such inorganic pigments can include titanium, zirconium or cerium oxides, and also zinc, iron or chromium oxides or iron(III) blue (ferric blue). Preferred organic pigments are, for example, the calcium, barium, zirconium or aluminium salts of acid dyes.

If desired, the pigments can also be used in the form of surface-modified pigments, for example modified by perfluoroalkyl phosphate, methylpolysiloxanes, methyl hydrogen polysiloxanes or chitosan. Suitable modified pigments are, for example, those described by B. G. Hays in Am. Inkmaker, (June, 1984) 28, (October, 1986) 13 and (November 1990) 28.

In addition, the pigments can also be used in the form of solid solutions, as are described in U.S. Pat. No. 4,783,540 and U.S. Pat. No. 4,810,304.

Those optionally modified pigments are advantageously used in the form of pigment preparations, in which the pigment is already present in dispersed form. Suitable preparations are described, for example, in W. Herbst, K. Hunger: Industrielle organische Pigmente, VCH Verdagsgesellschaft 1995, pages 92 ff.

A further embodiment of the present invention accordingly relates to cosmetic preparations or compositions comprising, based on the total weight,
a) from 0.0001 to 20% by weight of at least one diketopyrrolopyrrole pigment mixture prepared in accordance with the invention or diketopyrrolopyrrole pigment mixture according to the invention and
b) from 80 to 99.9999% by weight of a cosmetically suitable carrier material.

Suitable carrier materials for the cosmetic preparations and compositions according to the invention are the customary materials used in such formulations.

The cosmetic preparations and compositions according to the invention may be, for example, in the form of sticks, ointments, creams, emulsions, suspensions, dispersions, powders or solutions. Such cosmetic preparations or compositions are, for example, lipsticks, mascara preparations, blushers, eye-shadows, foundations, eyeliners, powders or nail varnishes.

When the preparations are in stick form, for example lipsticks, eye-shadows, blushers or foundations, a considerable part of such preparations consists of fatty components, which may consist of one or more waxes, for example ozokerite, lanolin, lanolin alcohol, hydrogenated lanolin, acetylated lanolin, lanolin wax, beeswax, candelilla wax, microcrystalline wax, carnauba wax, cetyl alcohol, stearyl alcohol, cocoa butter, lanolin fatty acids, petrolatum, petroleum jelly, mono-, di- or tri-glycerides or fatty esters thereof that are solid at 25° C., silicone waxes, such as methyloctadecane-oxypolysiloxane and poly(dimethylsiloxy)stearoxysiloxane, stearic acid monoethanolamine, colophane and derivatives thereof, such as glycol abietates and glycerol abietates, hydrogenated oils that are solid at 25° C., sugar glycerides and oleates, myristates, lanolates, stearates and dihydroxystearates of calcium, magnesium, zirconium and aluminium.

The fatty component may also consist of a mixture of at least one wax and at least one oil in which case the following oils, for example, are suitable: paraffin oil, purcelline oil, perhydrosqualene, sweet almond oil, avocado oil, calophyllum oil, castor oil, sesame oil, jojoba oil, mineral oils having a boiling point of about from 310 to 410° C., silicone oils, such as dimethylpolysiloxane, linoleyl alcohol, linolenyl alcohol, oleyl alcohol, cereal grain oils, such as wheatgerm oil, isopropyl lanolate, isopropyl palmitate, isopropyl myristate, butyl myristate, cetyl myristate, hexadecyl stearate, butyl stearate, decyl oleate, acetyl glycerides, octanoates and decanoates of alcohols and polyalcohols, for example of glycol and glycerol, ricinoleates of alcohols and polyalcohols, for example of cetyl alcohol, isostearyl alcohol, isocetyl lanolate, isopropyl adipate, hexyl laurate and octyl dodecanol.

The fatty components in such preparations in stick form may generally constitute up to 99.91% by weight of the total weight of the preparation.

The cosmetic preparations and compositions according to the invention may additionally comprise further constituents, such as, for example, glycols, polyethylene glycols, polypropylene glycols, monoalkanolamides, non-coloured polymeric, inorganic or organic fillers, preservatives, UV filters or other adjuvants and additives customary in cosmetics.

They comprise, for example, a natural or synthetic or partially synthetic di- or tri-glyceride, a mineral oil, a silicone oil, a wax, a fatty alcohol, a Guerbet alcohol or an ester thereof, a lipophilic functional cosmetic active ingredient, including sun-protection filters, or a mixture of such substances.

A lipophilic functional cosmetic active ingredient suitable for skin cosmetics, an active ingredient composition or an active ingredient extract is an ingredient or a mixture of ingredients that is approved for dermal or topical application.

The following may be mentioned by way of example:

active ingredients having a cleansing action on the skin surface and the hair; these include all substances that serve to cleanse the skin, such as oils, soaps, synthetic detergents and solid substances;

active ingredients having a deodorising and perspiration-inhibiting action: they include antiperspirants based on aluminium salts or zinc salts, deodorants comprising bactericidal or bacteriostatic deodorising substances, for example triclosan, hexachlorophene, alcohols and cationic substances, such as, for example, quaternary ammonium salts, and odour absorbers, for example ®Grillocin (combination of zinc ricinoleate and various additives) or triethyl citrate (optionally in combination with an antioxidant, such as, for example, butyl hydroxytoluene) or ion-exchange resins;

active ingredients that offer protection against sunlight (UV filters): suitable active ingredients are filter substances (sunscreens) that are able to absorb UV radiation from sunlight and convert it into heat; depending on the desired action, the following light-protection agents are preferred: light-protection agents that selectively absorb high-energy UV radiation in the range of approximately from 280 to 315 nm which causes sunburn (UV-B absorbers) and transmit the longer-wavelength range of, for example, from 315 to 400 nm (UV-A range), as well as light-protection agents that absorb only the longer-wavelength radiation of the UV-A range of from 315 to 400 nm (UV-A absorbers);

suitable light-protection agents are, for example, organic UV absorbers from the class of the p-aminobenzoic acid derivatives, salicylic acid derivatives, benzophenone derivatives, dibenzoylmethane derivatives, diphenyl acrylate derivatives, benzofuran derivatives, polymeric UV absorbers comprising one or more organosilicon radicals, cinnamic acid derivatives, camphor derivatives, trianilino-s-triazine derivatives, phenylbenzimidazole-sulfonic acid and salts thereof, menthyl anthranilates, benzotriazole derivatives, and/or an inorganic micropigment selected from aluminium oxide- or silicon dioxide-coated $TiO_2$, zinc oxide and mica;

active ingredients against insects (repellents) are agents that are intended to prevent insects from touching the skin and becoming active there; they drive insects away and evaporate slowly; the most frequently used repellent is diethyl toluamide (DEET); other common repellents will be found, for example, in W. Raab and U. Kindl "Pflegekosmetik", Gustav-Fischer-Verlag Stuttgart/ New York, 1991, page 161;

active ingredients for protection against chemical and mechanical influences: these include all substances that form a barrier between the skin and external harmful substances, such as, for example, paraffin oils, silicone oils, vegetable oils, PCL products and lanolin for protection against aqueous solutions, film-forming agents, such as sodium alginate, triethanolamine alginate, polyacrylates, polyvinyl alcohol or cellulose ethers for protection against the effect of organic solvents, or substances based on mineral oils, vegetable oils or silicone oils as "lubricants" for protecting the skin against severe mechanical stresses;

moisturising substances: the following substances, for example, are used as moisture-controlling agents (moisturisers): sodium lactate, urea, alcohols, sorbitol, glycerol, propylene glycol, collagen, elastin and hyaluronic acid;

active ingredients having a keratoplastic effect: benzoyl peroxide, retinoic acid, colloidal sulfur and resorcinol;

antimicrobial agents, such as, for example, triclosan or quaternary ammonium compounds;

oily or oil-soluble vitamins or vitamin derivatives suitable for dermal application: for example vitamin A (retinol in the form of the free acid or derivatives thereof), panthenol, pantothenic acid, folic acid, and combinations thereof, vitamin E (tocopherol), vitamin F; essential fatty acids; or niacinamide (nicotinic acid amide);

vitamin-based placenta extracts: active ingredient compositions comprising especially vitamins A, C, E, $B_{21}$, $B_{12}$, folic acid and biotin, amino acids and enzymes as well as compounds of the trace elements magnesium, silicon, phosphorus, calcium, manganese, iron or copper;

skin repair complexes: obtainable from inactivated and disintegrated cultures of bacteria of the bifidus group;

plants and plant extracts: for example arnica, aloe, beard lichen, ivy, stinging nettle, ginseng, henna, camomile, marigold, rosemary, sage, horsetail or thyme;

animal extracts: for example royal jelly, propolis, proteins or thymus extracts;

cosmetic oils suitable for dermal application: neutral oils of the Miglyol 812 type, apricot kernel oil, avocado oil, babassu oil, cottonseed oil, borage oil, thistle oil, groundnut oil, gamma-oryzanol, rosehip-seed oil, hemp oil, hazelnut oil, blackcurrant-seed oil, jojoba oil, cherry-stone oil, salmon oil, linseed oil, cornseed oil, macadamia nut oil, almond oil, evening primrose oil, mink oil, olive oil, pecan nut oil, peach kernel oil, pistachio nut oil, rape oil, rice-seed oil, castor oil, safflower oil, sesame oil, soybean oil, sunflower oil, tea tree oil, grapeseed oil or wheatgerm oil.

The preparations in stick form are preferably anhydrous but may in certain cases comprise a certain amount of water which, however, in general does not exceed 40% by weight, based on the total weight of the cosmetic preparation.

When the cosmetic preparations and compositions according to the invention are in the form of semi-solid products, that is to say in the form of ointments or creams, they may likewise be anhydrous or aqueous. Such preparations and compositions are, for example, mascaras, eyeliners, foundations, blushers, eye-shadows, or concealers for circles around the eyes.

When such ointments or creams are aqueous, they are especially emulsions of the water-in-oil type or of the oil-in-water type that comprise, apart from the diketopyrrolopyrrole pigment mixture prepared in accordance with the invention or the diketopyrrolopyrrole pigment mixture according to the invention, from 1 to 98.8% by weight of the fatty phase, from 1 to 98.8% by weight of the aqueous phase and from 0.2 to 30% by weight of an emulsifier.

Such ointments and creams may also comprise further conventional additives, such as, for example, fragrances, antioxidants, preservatives, gel-forming agents, UV filters, colorants, pigments, pearlescent agents, non-coloured polymers as well as inorganic or organic fillers.

When the preparations are in the form of a powder, they consist substantially of a mineral or inorganic or organic filler such as, for example, talcum, kaolin, starch, polyethylene powder or polyamide powder, as well as adjuvants such as binders, colorants etc.

Such preparations may likewise comprise various adjuvants conventionally employed in cosmetics, such as fragrances, antioxidants, preservatives etc.

When the cosmetic preparations and compositions according to the invention are nail varnishes, they consist substantially of nitrocellulose and a natural or synthetic polymer in the form of a solution in a solvent system, it being possible for the solution to comprise other adjuvants, for example pearlescent agents.

In that embodiment, the coloured polymer is present in an amount of approximately from 0.1 to 5% by weight.

The cosmetic preparations and compositions according to the invention may also be used for colouring the hair, in which case they are used in the form of shampoos, creams or gels that are composed of the base substances conventionally employed in the cosmetics industry and at least one diketopyrrolopyrrole pigment mixture prepared in accordance with the invention or diketopyrrolopyrrole pigment mixture according to the invention.

The cosmetic preparations and compositions according to the invention are produced in conventional manner, for example by mixing or stirring the components together, optionally with heating so that the mixtures melt.

Suitable formulations for cosmetic preparations or compositions are described, for example, in WO-A-00/33795 on pages 9 to 20. The 17 formulation examples given therein are also suitable for the diketopyrrolopyrrole pigment mixtures prepared in accordance with the invention or the diketopyrrolopyrrole pigment mixtures according to the invention if the latter are used, in the same concentrations, instead of the diketopyrrolopyrrole (DPP) pigments given therein.

The Examples that follow serve to illustrate the invention. Parts are parts by weight and percentages are percentages by weight, unless otherwise specified. Temperatures are given in degrees Celsius. The relation between parts by weight and parts by volume is the same as that between grams and cubic centimeters.

EXAMPLE 1

Preparation of octadecyl-thio-benzonitrile in Accordance with the Following Reaction Scheme:

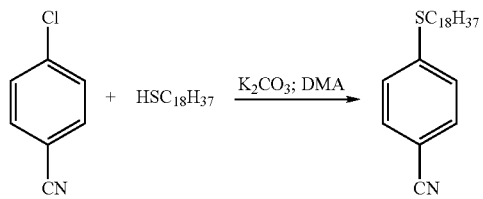

The reaction is carried out under an inert atmosphere in a 5-necked 750 ml sulfonating flask provided with a thermometer, a mechanical stirrer, a dropping funnel and a reflux condenser. 100.00 g (0.35 mol, 1.0 eq.) of 1-octadecanethiol are dissolved in 200 ml of dimethylacetamide (DMA) at 30° C. and added over 25 minutes to a white suspension of 48.18 g (0.35 mol, 1.0 eq.) of p-chlorobenzonitrile and 67.72 g (0.49 mol, 1.4 eq.) of finely ground potassium carbonate in 200 ml of dimethylacetamide. The reaction mixture is then heated to 135° C. and stirred at that temperature for 4 hours. The temperature is then reduced to 80° C. and the reaction mixture is stirred for 16 hours to complete the reaction. The reaction mixture is then discharged into 1600.0 g of water at room temperature. The white crystalline solid that precipitates out over one hour is filtered off and dried at 70° C. and 200 mbar. There are obtained 122.6 g (90.4% of theory) of the compound of formula

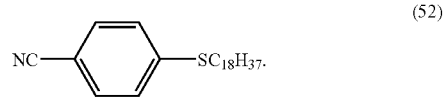

(52)

The compound of formula (52) can also be prepared starting from 4-mercaptobenzonitrile in analogy to a process published by S. Karisson, A. Hallberg and S. Gronowitz in *J. Organomet. Chem.* 1992, 430, 1, 53-60 or in analogy to a process published by W. H. Roark, B. D. Roth, A. Holmes, B. K. Trivedi, K. A. Kieft, A. D. Essenburg, B. R. Krause and R. L. Stanfield in *J. Med. Chem.* 1993, 36, 1662-1668 or also in analogy to a process published by D. A. Shirley and W. H. Reedy in *J. Amer. Chem. Soc.* 1951, 73, 4885-4886.

EXAMPLE 1B

Preparation of 4-octadecyloxybenzonitrile According to the Following Reaction Scheme:

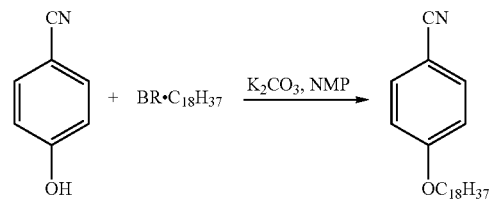

In a 750 ml sulfonating flask, 30.0 g (0.252 mol) of 4-hydroxybenzonitrile, 84.0 g (0.252 mol) of 1-bromooctadecane and 48.7 g (0.353 mol) of finely ground potassium carbonate are introduced into 200 ml of N-methylpyrrolidone (NMP) under a nitrogen atmosphere and heated at 120° C., with stirring. After being stirred for 15 hours, the mixture is cooled to room temperature and poured into 2 liters of water, whereupon a light-beige solid precipitates out, which is filtered off and washed with water. After drying at 60° C. and 150 mbar, there are obtained 90.8 g (97% of theory) of a colourless crystalline solid of formula

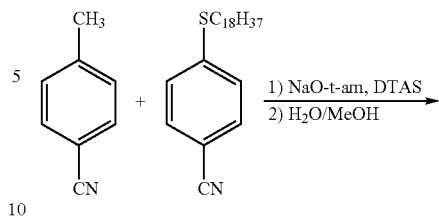

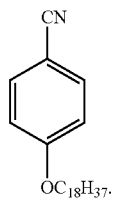

EXAMPLE 2

Preparation of a Mixture Comprising the Pigments of Formulae (100)

(101)

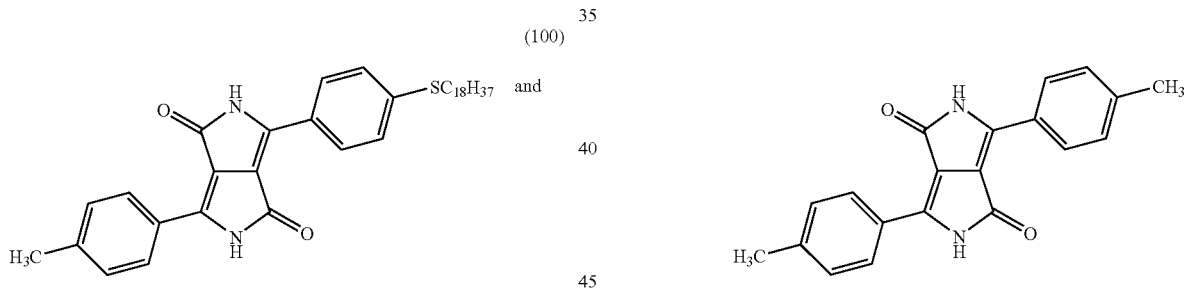

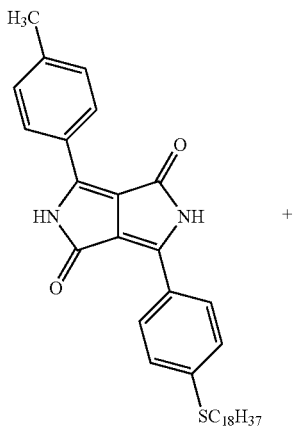

according to the following reaction scheme:

The reaction is carried out under an inert atmosphere in a 5-necked 750 ml sulfonating flask provided with a thermometer, a mechanical stirrer, a dropping funnel and a reflux condenser. The protonation and conditioning step is carried out in a 5-necked 2.5 liter sulfonating flask provided with a thermometer, a mechanical stirrer and a reflux condenser.

24.8 g (1.08 mol, 4.0 eq.) of sodium are added to a solution of 400 ml of tert-amyl alcohol and a catalytic amount of Fe(III)Cl$_3$ at 112° C. The sodium dissolves, with the formation of sodium tert-amylate and H$_2$, over 40 minutes at 112° C. To the resulting solution there are then added 62.0 g (0.53 mol, 1.96 eq.) of p-tolunitrile and 4.2 g (0.01 mol, 0.04 eq.) of p-octadecylthiobenzonitrile and then, over 5 hours at 105° C., 92.2 g (0.31 mol, 1.15 eq.) of succinic acid di-tert-amyl ester. The reaction mixture is stirred for a further 2 hours at 105° C. and cooled to room temperature overnight. The reaction mixture is then added to a solution of 450 ml of water and 450 ml of methanol (at room temperature) over 15 minutes. The resulting mixture is heated to 32° C. and stirred for 4.5 hours at that temperature. The red precipitate is filtered off, washed with 500 ml of methanol and 500 ml of water and dried at 80°

C. and 200 mbar. 75.2 g (about 87% of theory) of a red mixture comprising the pigments of formulae (100) and (101) are obtained.

EXAMPLE 2B

A mixture of 24.83 g (1.08 mol) of sodium, a spatula tip of FeCl$_3$ and 400 ml of tert-amyl alcohol is refluxed under a nitrogen atmosphere in a 750 ml sulfonating flask. To the resulting clear solution there are added 59.47 g (0.508 mol) of 4-tolunitrile and 12.56 g (0.0324 mol) of 4-octadecylthiobenzonitrile, with stirring. 97.7 ml (0.311 mol) of succinic acid di-tert-amyl ester are then added dropwise over 5 hours. After the addition is complete, the resulting dark-red suspension is stirred for a further 2 hours under reflux and then cooled to room temperature. The reaction mixture is then added to a mixture of 450 g of water/ice and 450 ml of methanol over a period of 45 minutes, during which the temperature does not rise above 20° C., and is then stirred under reflux at 83° C. for 4.5 hours to complete the reaction. The pigment composition obtained in that manner is filtered off and washed with methanol and water. Drying overnight in vacuo at 80° C. yields 77.7 g (82.5% of theory) of a pigment mixture comprising the pigments of formulae (100) and (101), which in PVC results in a transparent red coloration.

EXAMPLES 2C-2E

Examples 2C-2E are prepared in analogous manner to Example 1A except that the 4-octadecylthiobenzonitrile is replaced by the nitriles set out in the table below.

| Example | Nitrile | Yield | Coloration in PVC |
|---|---|---|---|
| 2C | 4-decylthiobenzonitrile | 82% of theory | transparent red |
| 2D | 4-decyloxybenzonitrile | 82% of theory | transparent red |
| 2E | 4-octadecyloxybenzonitrile | 81% of theory | transparent red |

EXAMPLE 3

Preparation of a Mixture Comprising the Pigments of Formulae

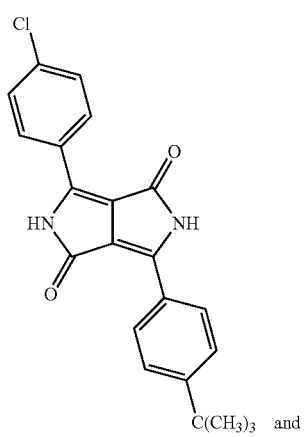
(102)

and

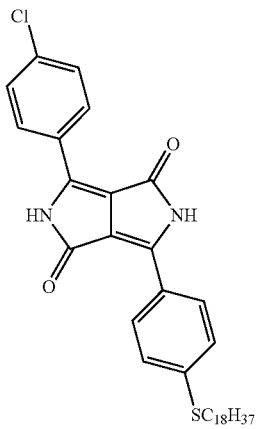
(103)

according to the following reaction scheme:

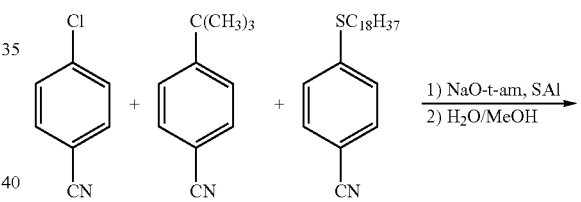

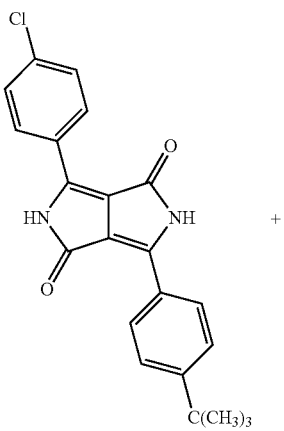

+

-continued

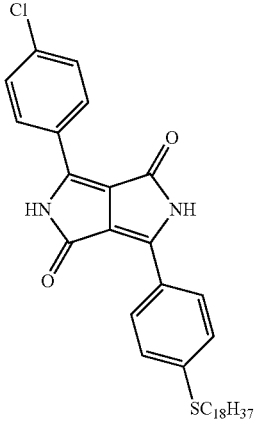

+ etc

The reaction is carried out under an inert atmosphere in a 5-necked 1.5 liter sulfonating flask provided with a thermometer, a mechanical stirrer, a dropping funnel and a reflux condenser. The protonation and conditioning step is carried out in a 5-necked 2.5 liter sulfonating flask provided with a thermometer, a mechanical stirrer and a reflux condenser.

24.8 g (1.08 mol, 4.0 eq.) of sodium are added to a solution of 170 ml of tert-amyl alcohol and a catalytic amount of Fe(III)Cl$_3$ at 112° C. The sodium dissolves, with the formation of sodium tert-amylate and H$_2$, over 40 minutes at 112° C. To the resulting solution there are then added 34.46 g (0.22 mol, 0.8 eq.) of p-(tert-butyl)-benzonitrile. Then 44.64 g (0.32 mol, 1.2 eq.) of p-chlorobenzonitrile, 8.4 g (0.02 mol. 0.08 eq.) of p-octadecylthiobenzonitrile and 59.12 g (0.30 mol) of succinic acid diisopropyl ester are dissolved in 100 ml of tert-amyl alcohol at 60° C. and added over 3.3 hours to the reaction mixture. In the first hour of addition the internal temperature is maintained at 105° C. but is then reduced to 95° C. A further 10.95 g (0.05 mol. 0.2 eq) of succinic acid diisopropyl ester are added over an hour and the reaction mixture is stirred at 95° C. for a further hour and cooled to room temperature overnight. The reaction mixture is then introduced into a solution of 1062 g of water and 213 g of methanol (at room temperature) over 20 minutes. The resulting mixture is heated to 76° C. and stirred at that temperature for 4 hours. The dark-red precipitate is then filtered off, washed with 5 liters of methanol and 5 liters of water and dried at 80° C. and 200 mbar. 81.5 g (80% of theory) of a mixture comprising the pigments of formulae (102) and (103) are obtained.

EXAMPLE 4

A mixture of 22.94 g (0.998 mol) of sodium and 199.6 g of tert-amyl alcohol is refluxed overnight at a temperature from 110 to 115° C. The resulting clear solution is stirred at 105° C. and to that solution there is added, dropwise over 3 hours, a mixture of 66.21 g (0.481 mol) of p-chlorobenzonitrile, 12.01 g (0.031 mol) of p-octadecylbenzonitrile and 64.22 g (0.317 mol) of succinic acid diisopropyl ester dissolved in 121.93 g of tert-amyl alcohol; after the addition is complete, the reaction mixture is stirred for 4 hours.

The reaction mixture is then cooled to 23° C. and discharged into a mixture of 422 ml of water and 422 ml of methanol at a temperature of from 25 to 30° C.; it is then heated to 78° C. (reflux) and maintained at that temperature for 6 hours. After cooling to room temperature, the suspension formed is filtered off, washed with 1.5 liters of methanol and 2 liters of water and dried at 80° C. in vacuo overnight.

There are obtained 66 g (70% of theory) of a red mixture comprising the pigments of formulae

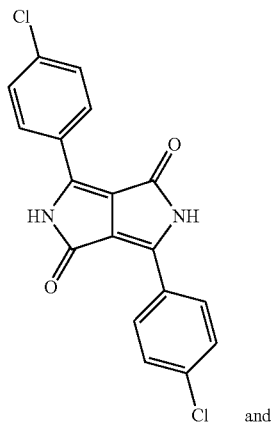

(104)

and

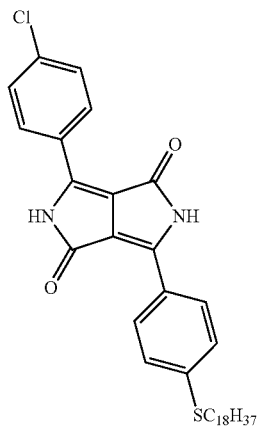

(103)

which imparts a transparent red colour to PVC.

EXAMPLE 4B

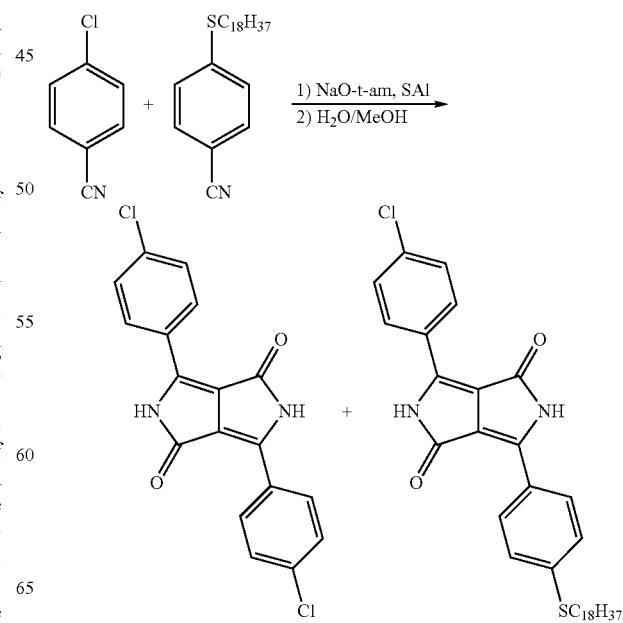

The reaction is carried out under an inert atmosphere in a 5-necked 1.5 liter sulfonating flask provided with a thermometer, a mechanical stirrer, a dropping funnel and a reflux condenser. The protonation and conditioning step is carried out in a 5-necked 2.5 liter sulfonating flask provided with a thermometer, a mechanical stirrer and a reflux condenser.

22.96 g (1.0 mol) of sodium are added to a solution of 200 g of tert-amyl alcohol and a catalytic amount of Fe(III)Cl$_3$ at 112° C. The sodium dissolves, with the formation of sodium tert-amylate and H$_2$, over 60 minutes at 112° C. Then 66.21 g (0.48 mol) of p-chlorobenzonitrile, 5.95 g (0.016 mol) of p-octadecylthiobenzonitrile and 48.16 g (0.238 mol) of succinic acid diisopropyl ester (SAI) are dissolved in 121 g of tert-amyl alcohol at 90° C. and added over 2 hours to the reaction mixture. In the first hour of addition the internal temperature is maintained at 112° C. but is then reduced to 85° C. A further 16.06 g (0.08 mol) of SAI are then added over 3 hours and the reaction mixture is stirred at 85° C. for a further 4 hours and cooled to room temperature. The reaction mixture is then transferred into a solution of 552 ml of water and 522 ml of methanol at room temperature over 20 minutes. The resulting mixture is heated to 50° C. and stirred at that temperature for 4 hours. The dark-red precipitate is then filtered off, washed with 8 liters each of methanol and water and dried at 80° C. and 200 mbar in a drying cabinet. 88.3 g (96% of theory) of a red mixture comprising the pigments of formulae (103) and (104) are obtained, which in PVC results in a transparent red coloration.

Example 4C is prepared in analogous manner except that octadecyloxy-benzonitrile is added to the sodium tert-amylate directly and not together with the p-chlorobenzonitrile and SAI.

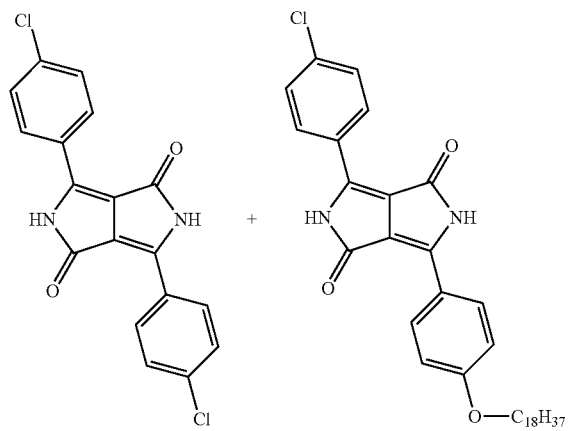

EXAMPLE 4D

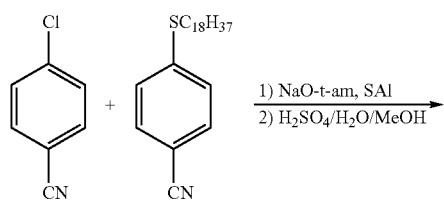

-continued

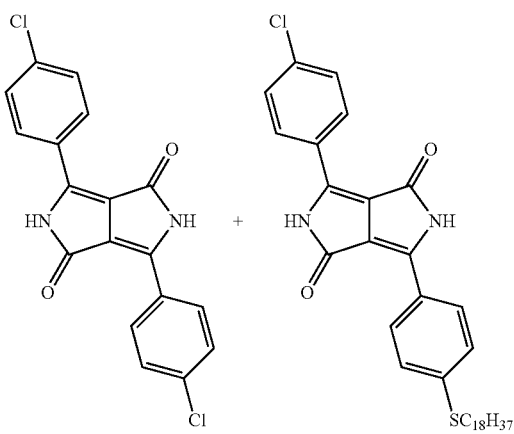

The reaction is carried out under an inert atmosphere in a 5-necked 1.5 liter sulfonating flask provided with a thermometer, a mechanical stirrer, a dropping funnel and a reflux condenser. The protonation and conditioning step is carried out in a 5-necked 2.5 liter sulfonating flask provided with a thermometer, a mechanical stirrer and a reflux condenser.

44.5 g (1.9 mol) of sodium are added to a solution of 348 g of tert-amyl alcohol and a catalytic amount of Fe(III)Cl$_3$ at 115° C. The sodium dissolves, with the formation of sodium tert-amylate and H$_2$, over 40 minutes at 115° C. Then 137.6 g (1.0 mol) of p-chlorobenzonitrile, 12.3 g (32 mmol) of p-octadecylthiobenzonitrile and 94.2 g (0.46 mol) of succinic acid diisopropyl ester (SAI) are dissolved in 220 g of tert-amyl alcohol at 60° C. and added over 2 hours to the reaction solution. In the first hour of addition the internal temperature is maintained at 115° C. but is then slowly reduced to 85° C. A further 31.0 g (0.15 mol) of SAI are then added over 3 hours. Over a further 3 hours, 160 g of an azeotropic mixture of isopropanol and tert-amyl alcohol are then distilled off under reduced pressure (350 mbar) at 85° C. The reaction mixture is cooled to room temperature and, over 2.5 hours, added to a mixture of 349 g of ice, 170 g of methanol and 163 g of 60% sulfuric acid at 0° C. During the addition, there are added a further 231 g of MeOH and a total of 1440 g of ice in portions. The resulting mixture is stirred at 0° C. for 5 hours. The dark-red precipitate is filtered off, washed with 5 liters each of methanol and water and dried at 80° C. and 200 mbar in a drying cabinet. There are obtained 170 g (88%) of a red mixture comprising the pigments of formulae (103) and (104), which in PVC results in a transparent red coloration.

Using the appropriately substituted benzonitriles (Examples 4E-4G from the table below) instead of 4-octadecylthiobenzonitrile, further pigments are synthesised in the mentioned yields in analogous manner. Examples 4H and 4J are prepared in analogous manner except that the substituted benzonitrile is introduced into the sodium tert-amylate directly and not added together with the 4-chlorobenzonitrile and SAI.

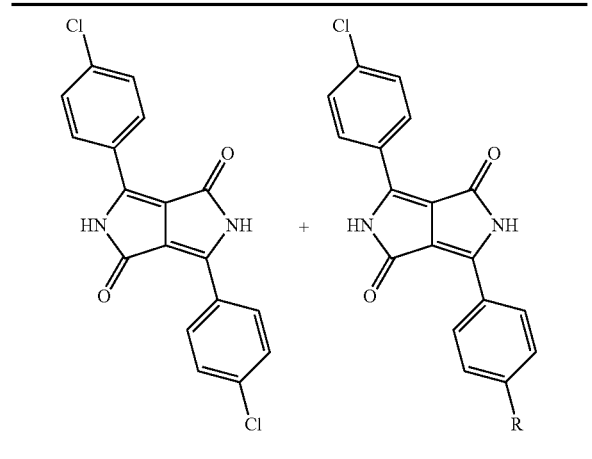

| Example | R | Yield |
|---------|---|-------|
| 4E | —O—C$_{10}$H$_{21}$ | 82% |
| 4F | —S—C$_{10}$H$_{21}$ | 87% |
| 4G | —O—C$_{18}$H$_{37}$ | 88% |
| 4H | —S(CH$_2$)$_3$SO$_3$Na | 90% |
| 4J | —(OCH$_2$)$_3$OCH$_3$ | 83% |

EXAMPLE 5

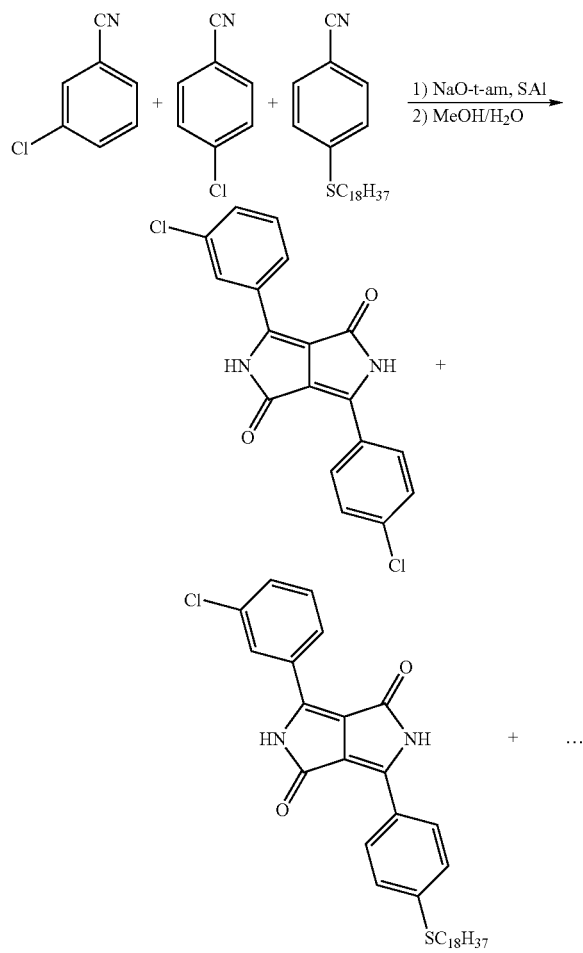

38.8 g (1.68 mol) of sodium cut into small pieces and a spatula tip of FeCl$_3$ are introduced into 375 ml of tert-amyl alcohol in a 1 liter sulfonating flask and heated to reflux (bath temperature of 130° C.). To the resulting clear solution there is then added a solution of 72.3 g (0.53 mol) of 3-chlorobenzonitrile, 31.0 g (0.23 mol) of 4-chlorobenzonitrile, 14.2 g (0.038 mol) of 4-octadecylthiobenzonitrile and also 92.9 ml (0.45 mol) of succinic acid diisopropyl ester (SAI) in 225 ml of tert-amyl alcohol via a heated dropping funnel over 3 hours, the bath temperature being set at 95° C. at the beginning. After the addition is complete, a further 15.5 ml (0.075 mol) of SAI are added over 30 minutes. The reaction mixture is then cooled to 50° C. and transferred to a mixture of 375 ml of methanol and 1125 ml of water at room temperature over 30 minutes. After the addition is complete, stirring is carried out overnight to complete the reaction. The orange suspension is filtered and washed with methanol and then with water. After drying overnight at 80° C. and 200 mbar in a drying cabinet, there are obtained 136.9 g (91% of theory) of a pigment which in PVC results in a transparent, tinctorially strong, orange coloration.

EXAMPLE 6

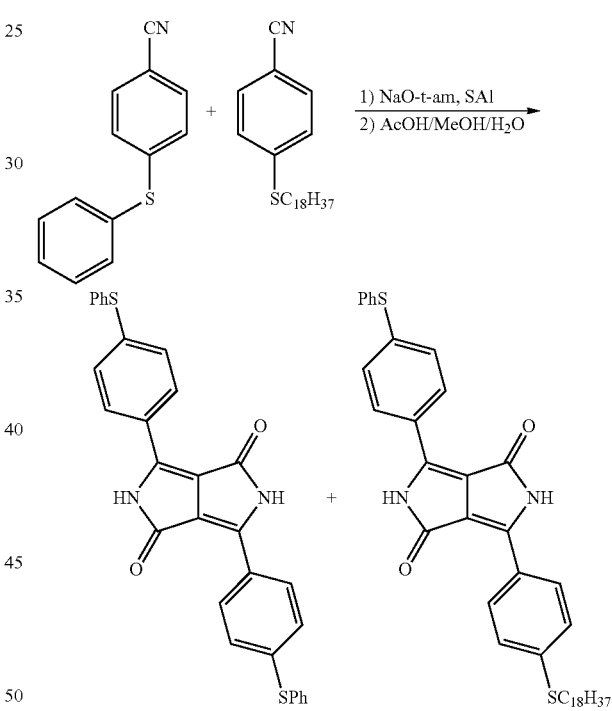

25.9 g (1.13 mol) of sodium cut into small pieces and a spatula tip of FeCl$_3$ are introduced into 250 ml of tert-amyl alcohol in a 1 liter sulfonating flask and heated to reflux (bath temperature of 130° C.). Into the resulting clear solution there is then added a solution of 107.2 g (0.50 mol) of 4-phenylthiobenzonitrile, 2.1 g (0.005 mol) of 4-octadecylthiobenzonitrile and 73.43 g (0.36 mol) of succinic acid diisopropyl ester (SAI) in 100 ml of tert-amyl alcohol via a heated dropping funnel (90° C.) over 3 hours. After the addition is complete, stirring is carried out at reflux for a further 1.5 hours. The reaction mixture is then cooled to room temperature and, over 30 minutes, transferred by means of a pump into a mixture of 1000 ml of water/ice, 200 ml of methanol and 90 g of glacial acetic acid at 0° C. After the addition is complete, stirring is carried out overnight at 0-10° C. to complete the reaction. The red suspension is then filtered and washed with methanol and then with water. After drying overnight at 70° C. and 200 mbar in a drying cabinet, there are obtained 106.3 g (87% of theory) of a pigment which in PVC results in a transparent, tinctorially strong, red coloration.

EXAMPLE 6B

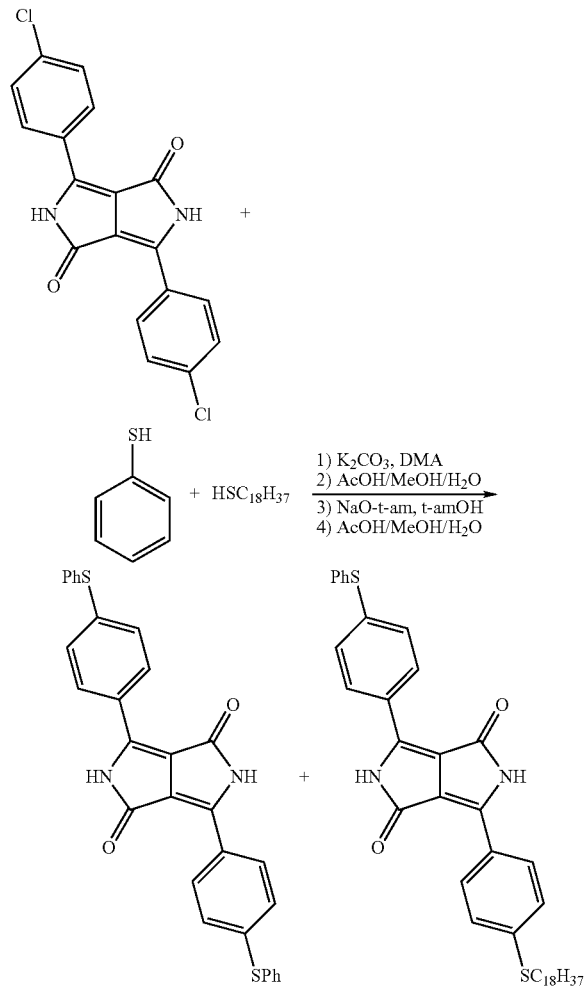

107.2 g (0.30 mol) of a commercially available form of C.I. Pigment Red 254 and 97.4 g (0.71 mol) of anhydrous finely ground potassium carbonate are introduced into 1 liter of N,N-dimethylformamide (DMA) in a 2.5 liter sulfonating flask and stirred vigorously under a nitrogen atmosphere at 70° C. A mixture of 65.8 g (0.585 mol) of thiophenol and 4.52 g (0.015 mol) of 1-octadecylthiol is then added dropwise via a dropping funnel. The mixture is then stirred at 130° C. for 2.5 hours and subsequently stirred overnight at 110° C. to complete the reaction. After cooling to room temperature, the mixture is slowly added to a mixture of 45 g of glacial acetic acid, 2.25 liters of methanol and 450 ml of water and, after addition is complete, is stirred for 2 hours. The red precipitate is filtered off and then washed successively with methanol and water. After drying overnight at 80° C. and 200 mbar in a drying cabinet, 149.1 g (98.6% of theory) of a red crude pigment of coarse particle size are obtained.

Some of that crude pigment is reacted in accordance with following procedure in order further to optimise the particle form:

5.0 g (0.22 mol) of sodium cut into small pieces and a spatula tip of $FeCl_3$ are introduced into 200 ml of tert-amyl alcohol in a 750 ml sulfonating flask and, under a nitrogen atmosphere, heated to reflux (bath temperature of 130° C.). To the resulting clear solution there are then added 25.2 g (about 0.05 mol) of the crude pigment in portions, with stirring. After addition is complete, stirring is carried out for a further 2 hours under reflux. The reaction mixture is then cooled to room temperature and, over 30 minutes, transferred by means of a pump into a mixture of 500 ml of water/ice, 100 ml of methanol and 18 g (0.3 mol) of glacial acetic acid at 0° C. After addition is complete, stirring is carried out at 0-10° C. overnight to complete the reaction. The red suspension is then filtered and washed with methanol and then with water. After drying overnight at 70° C. and 200 mbar in a drying cabinet, there are obtained 24.0 g (95.2% of theory) of a pigment which in PVC results in a transparent, tinctorially strong, red coloration.

| Cosmetic Formulation 1: Powder foundation | | | |
|---|---|---|---|
| Number | Ingredients | | Amount [%] |
| | Phase A | | |
| 1 | Talc | | 48.20 |
| 2 | Mica and Methicone (Toshiki Sericite OS-61D) | | 34.00 |
| 3 | Pigment mixture prepared according to Example 2 | | 5.00 |
| 4 | Kaolin | | 6.00 |
| 5 | Zinc Stearate | | 3.00 |
| 6 | Methyl Paraben | | 0.20 |
| 7 | Propyl Paraben | | 0.10 |
| | Phase B | | |
| 8 | Dicaprylyl Maleate | | 3.00 |
| 9 | PEG-400 Diisostearate | | 0.50 |

Phase A is put into high shear mixer and mixed until colour are completely extended. All ingredients of phase B are put together and mixed until phase B is fully homogenous.

Phase B is sprayed to phase A with high mixing.

The united phases are mixed fully homogenous by a high shear mixer.

There is obtained a powder foundation having excellent in-use properties and an intense bright red colour of outstanding fastness to light.

| Cosmetic Formulation 2: Lipstick Formulation | | |
|---|---|---|
| Number | Ingredients | Amount [%] |
| 1 | Castor Oil LISP | 15.00 |
| 2 | Pigment mixture prepared according to Example 2 | 1.40 |
| 3 | FD&C Blue 1 B3016 Aluminum Lake | 0.25 |
| 4 | FD&C Yellow 5 B3014 Aluminum Lake | 0.20 |
| 5 | $TiO_2$ pigment | 3.00 |
| 6 | Cosmetic Yellow C33-8073 | 1.00 |
| 7 | Red Iron Oxide 3080 | 3.20 |
| 8 | Castor Oil LISP | 31.40 |
| 9 | White Beeswax | 2.00 |
| 10 | Performalene 400 | 4.00 |
| 11 | Carnauba Wax | 2.00 |
| 12 | Candelilla Wax | 5.00 |

-continued

| | Cosmetic Formulation 2: Lipstick Formulation | |
|---|---|---|
| Number | Ingredients | Amount [%] |
| 13 | Caprylic/Capric Triglyceride | 8.00 |
| 14 | Octyl Methoxycinnamate | 7.50 |
| 15 | Lanolin Oil | 2.00 |
| 16 | Stearyl Alcohol | 2.00 |
| 17 | Jojoba Oil | 6.00 |
| 18 | Shea Butter | 2.00 |
| 19 | Cetyl Palmitate | 3.00 |
| 20 | Propyl Paraben | 0.20 |
| 21 | Tocopheryl Acetate | 0.10 |
| 22 | Lipstick Fragrance | 0.75 |

Ingredients 8-21 are mixed at a temperature of 75-80° C. until the phase is uniform.

Ingredients 1-7 are mixed together and grinded in a ball mill or 3-roll mill. Afterwards ingredients 1-7 are added to the mixture of ingredients 8-21. The mixture is mixed at a temperature of 75-80° C. Afterwards ingredient 22 is added and the mixture is mixed at a temperature of about 70° C.

A lipstick having excellent in-use properties is obtained in that manner.

| | Cosmetic Formulation 3: Nail varnish: | |
|---|---|---|
| Number | Ingredients | Amount [%] |
| 1 | sodium selenite | 0.01 |
| 2 | ethyl acetate | 20.00 |
| 3 | isobutyl acetate | 26.99 |
| 4 | isopropyl alcohol | 2.00 |
| 5 | Toluene | 20.00 |
| 6 | Nitrocellulose | 17.00 |
| 7 | saccharose acetate isobutyrate | 8.00 |
| 8 | dibutyl phthalate | 3.80 |
| 9 | 1,3-butylene glycol | 0.20 |
| 10 | Pigment mixture prepared according to Example 2 | 1.00 |
| 11 | stearylalkonium hectorite | 1.00 |

A red nail varnish having very good in-use properties and outstanding gloss is obtained. After application of the nail varnish, a waiting period of three days and removal of the nail varnish, it is found that the nail has remained completely unstained.

-continued
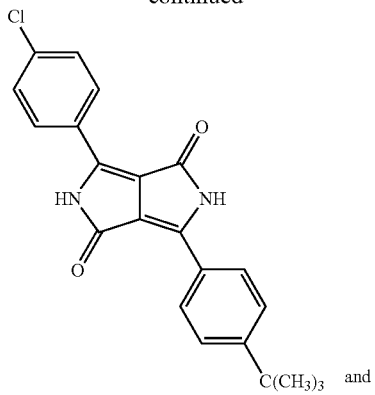 and
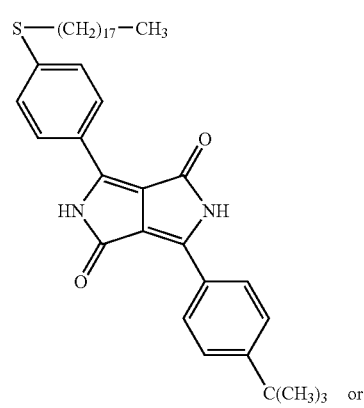 or
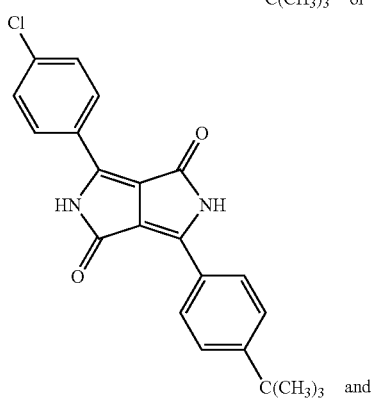 and
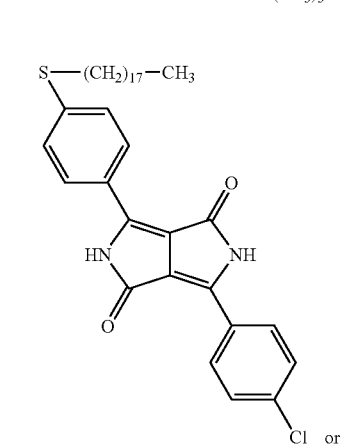 or
-continued
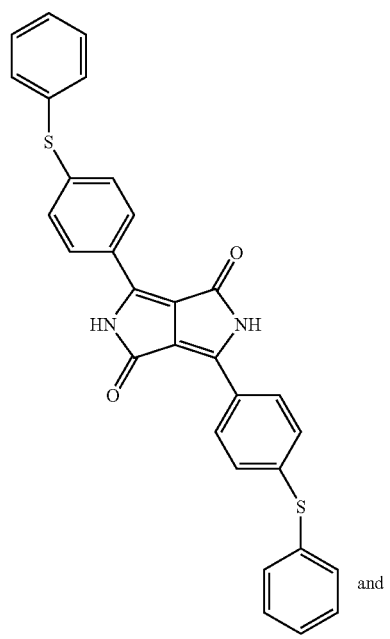 and
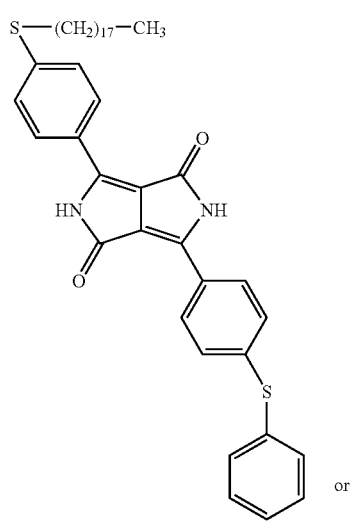 or
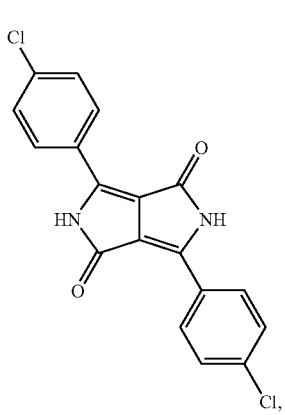, -continued
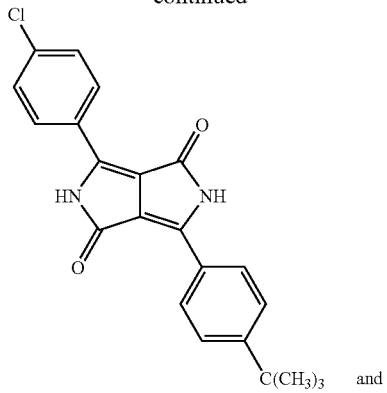
and
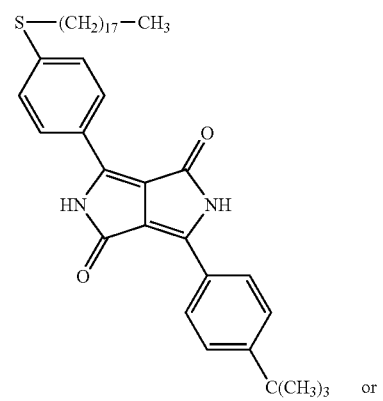
or
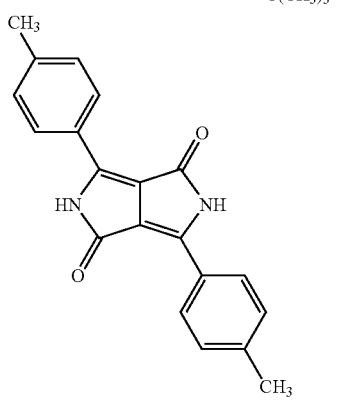
and
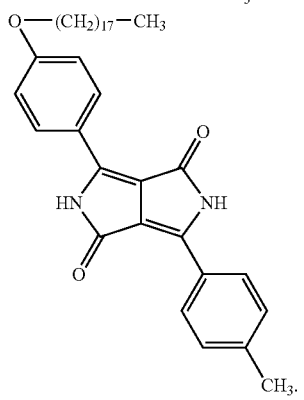
2. A mixture according to claim 1 comprising the diketopyrrolopyrrole pigments of formulae
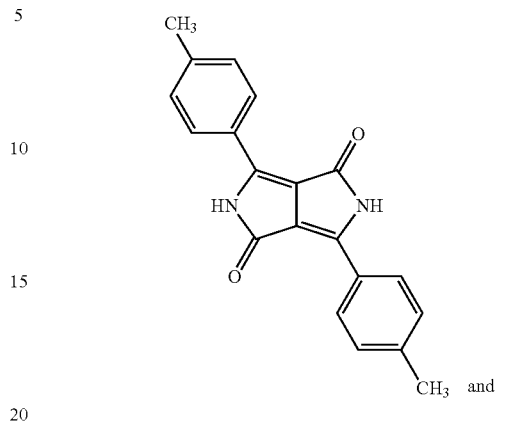
and
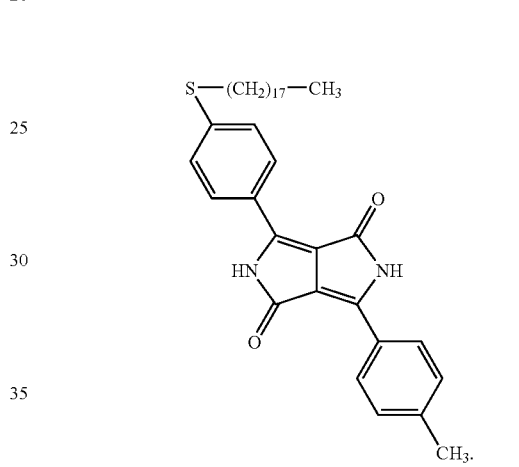
3. A mixture according to claim 1 comprising the diketopyrrolopyrrole pigments of formulae
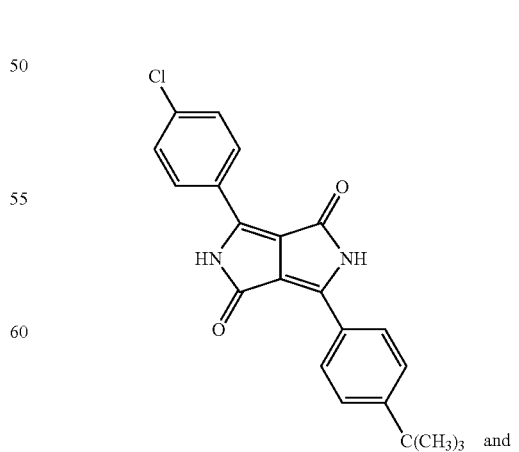
and -continued
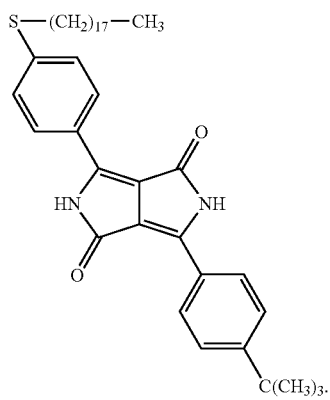
4. A mixture according to claim 1 comprising the diketo-pyrrolopyrrole pigments of formulae
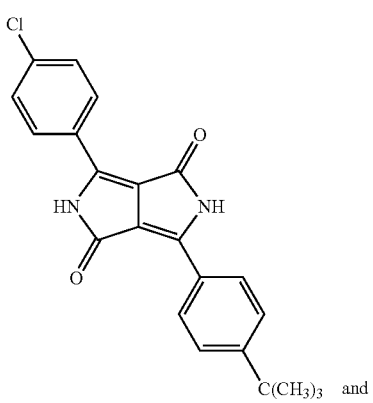
and
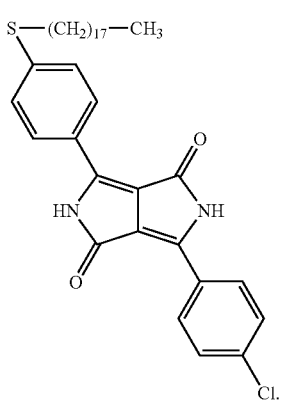
5. A mixture according to claim 1 comprising the diketo-pyrrolopyrrole pigments of formulae
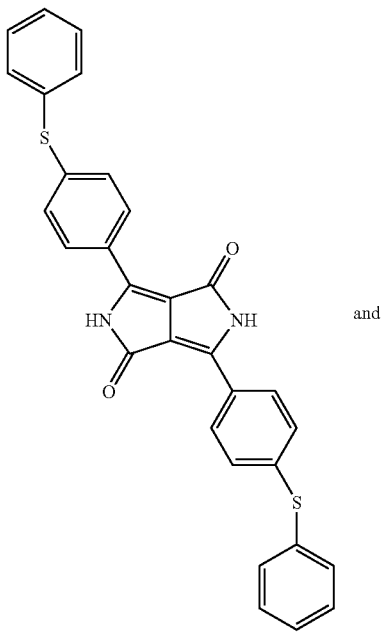
and
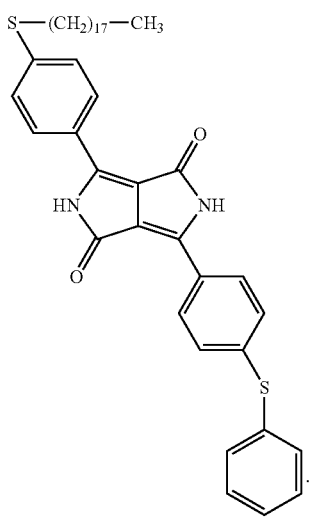

6. A mixture according to claim 1 comprising diketopyrrolopyrrole pigments of formulae
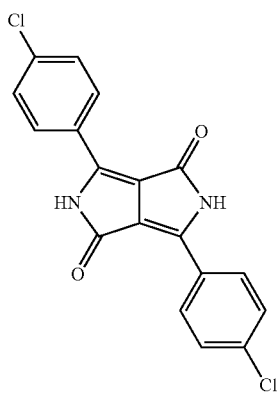 and
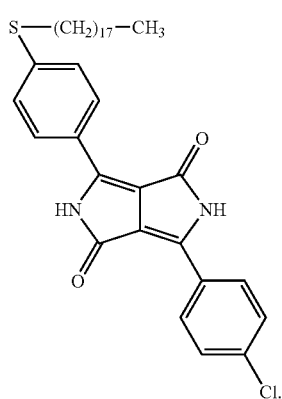
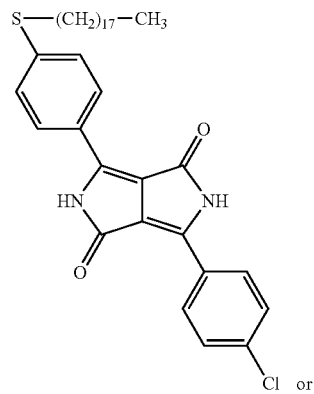 or
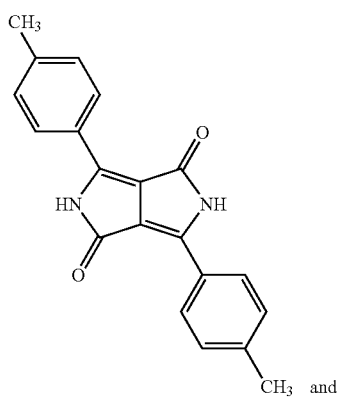 and
7. A method of producing coloured plastics or coloured polymeric particles, which comprises incorporating into plastics or polymeric particles a diketopyrrolopyrrole pigment mixture comprising the formulae:
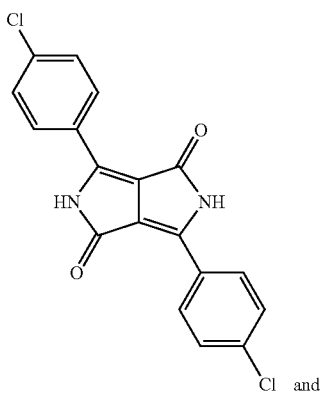 and
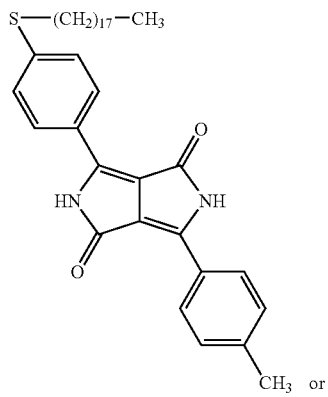 or -continued
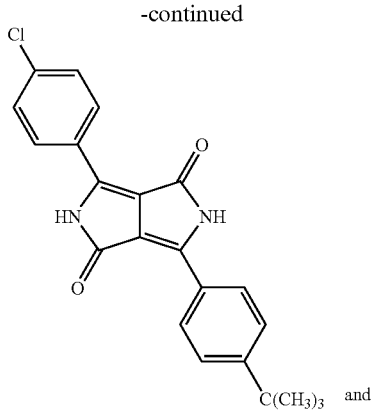
and
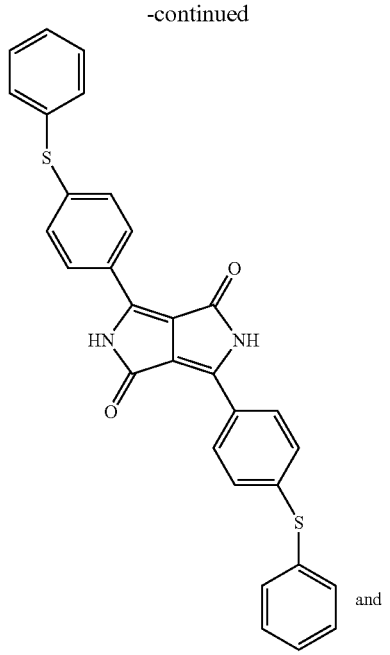
and
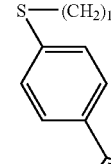
or -continued
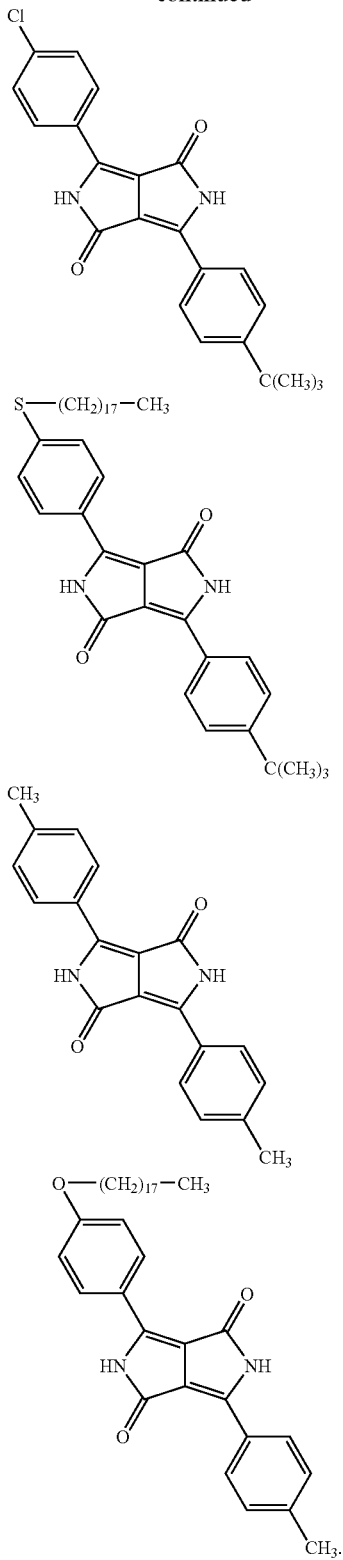
8. A method according to claim 7, wherein the coloured plastics or coloured polymeric particles are comprised within a colour filter.
9. A mixture according to claim 1 comprising the diketopyrrolopyrrole pigments of formula
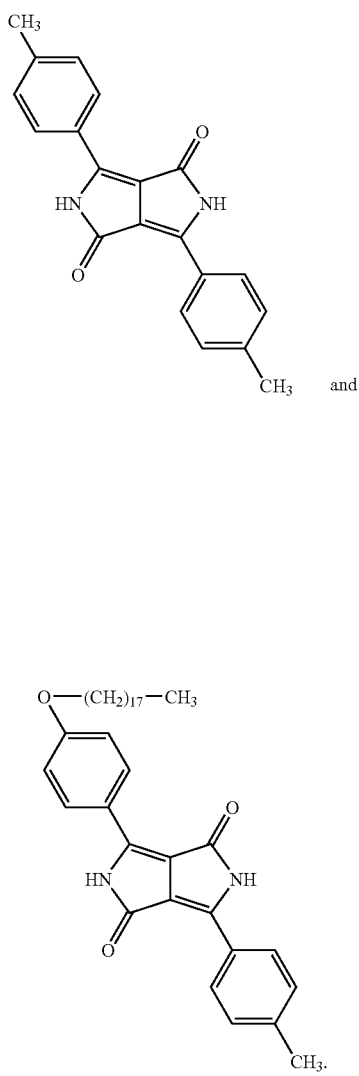

What is claimed is:
1. A mixture comprising diketopyrrolopyrrole pigments of formulae

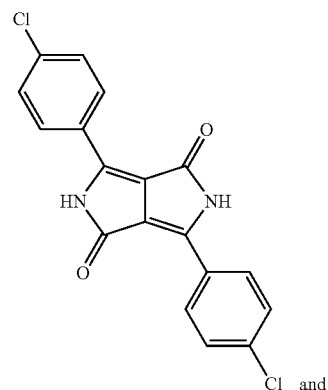

and

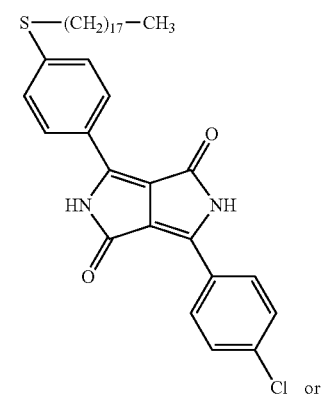

or

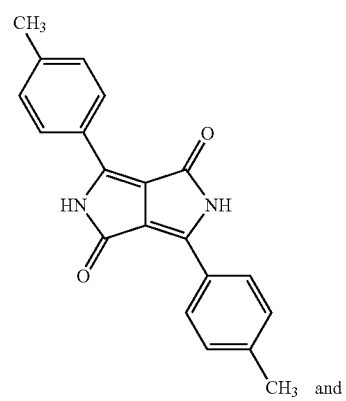

and

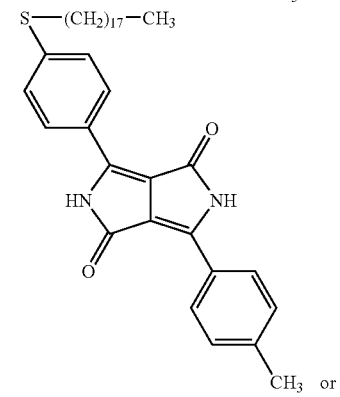

or